United States Patent
Zhang et al.

(12) 
(10) Patent No.: US 12,230,833 B2
(45) Date of Patent: Feb. 18, 2025

(54) SEPARATOR HAVING SILANE-MODIFIED POLYOLEFIN AND POLYETHYLENE, AND METHOD FOR PRODUCING THE SAME

(71) Applicant: Asahi Kasei Battery Separator Corporation, Tokyo (JP)

(72) Inventors: Xun Zhang, Tokyo (JP); Ryo Kuroki, Tokyo (JP); Yuki Fukunaga, Tokyo (JP); Hiromi Kobayashi, Tokyo (JP)

(73) Assignee: Asahi Kasei Battery Separator Corporation, Tokyo (JP)

( * ) Notice: Subject to any disclaimer, the term of this patent is extended or adjusted under 35 U.S.C. 154(b) by 218 days.

(21) Appl. No.: 17/849,149

(22) Filed: Jun. 24, 2022

(65) Prior Publication Data

US 2023/0006306 A1    Jan. 5, 2023

Related U.S. Application Data

(62) Division of application No. 16/957,908, filed as application No. PCT/JP2019/040342 on Oct. 11, 2019, now Pat. No. 11,670,822.

(30) Foreign Application Priority Data

Oct. 11, 2018 (JP) .................................. 2018-192964
Nov. 1, 2018 (JP) .................................. 2018-206944
(Continued)

(51) Int. Cl.
*H01M 50/411* (2021.01)
*H01M 10/0525* (2010.01)
(Continued)

(52) U.S. Cl.
CPC ..... *H01M 50/411* (2021.01); *H01M 10/0525* (2013.01); *H01M 10/0587* (2013.01);
(Continued)

(58) Field of Classification Search
CPC ............ H01M 50/411; H01M 50/489; H01M 50/403; H01M 50/491; H01M 50/46; H01M 50/443; H01M 10/0525
(Continued)

(56) References Cited

U.S. PATENT DOCUMENTS

2006/0093786 A1  5/2006  Ohashi et al.
2006/0127753 A1  6/2006  Nakashima et al.
(Continued)

FOREIGN PATENT DOCUMENTS

CN    1738711 A    2/2006
CN    1860627 A    11/2006
(Continued)

OTHER PUBLICATIONS

Extended European Search Report issued in related European Patent Application No. 23161865.3 dated Aug. 1, 2023.
(Continued)

*Primary Examiner* — Sean P Cullen
(74) *Attorney, Agent, or Firm* — Morgan, Lewis & Bockius LLP

(57) ABSTRACT

There is provided a method for producing a separator for an electricity storage device that includes a step of contacting a porous body formed from a silane-modified polyolefin-containing molded sheet with a base solution or acid solution, and a separator for an electricity storage device comprising a microporous film with a melted film rupture temperature of 180° C. to 220° C. as measured by thermomechanical analysis (TMA).

9 Claims, 5 Drawing Sheets

(30) Foreign Application Priority Data

Jul. 31, 2019 (JP) ................................ 2019-141639
Jul. 31, 2019 (JP) ................................ 2019-141651

(51) Int. Cl.

| | | |
|---|---|---|
| *H01M 10/0587* | (2010.01) | |
| *H01M 50/403* | (2021.01) | |
| *H01M 50/443* | (2021.01) | |
| *H01M 50/46* | (2021.01) | |
| *H01M 50/489* | (2021.01) | |
| *H01M 50/491* | (2021.01) | |

(52) U.S. Cl.
CPC ....... *H01M 50/403* (2021.01); *H01M 50/443* (2021.01); *H01M 50/46* (2021.01); *H01M 50/489* (2021.01); *H01M 50/491* (2021.01)

(58) Field of Classification Search
USPC ........................................ 429/144, 251, 254
See application file for complete search history.

(56) References Cited

U.S. PATENT DOCUMENTS

| | | | |
|---|---|---|---|
| 2007/0184340 A1 | 8/2007 | Ichikawa et al. | |
| 2008/0118827 A1* | 5/2008 | Call .................... | H01M 50/489 |
| | | | 429/129 |
| 2009/0148762 A1 | 6/2009 | Kasamatsu et al. | |
| 2010/0069596 A1 | 3/2010 | Kimishima | |
| 2010/0087552 A1 | 4/2010 | Shiomi et al. | |
| 2010/0221965 A1 | 9/2010 | Katayama et al. | |
| 2011/0027660 A1* | 2/2011 | Takeda .................... | C08J 5/18 |
| | | | 521/143 |
| 2011/0135988 A1 | 6/2011 | Noumi et al. | |
| 2011/0159346 A1 | 6/2011 | Yamamoto et al. | |
| 2011/0229768 A1 | 9/2011 | Pan et al. | |
| 2011/0232836 A1 | 9/2011 | Uetani et al. | |
| 2011/0311878 A1 | 12/2011 | Inagaki et al. | |
| 2012/0070644 A1 | 3/2012 | Kang et al. | |
| 2012/0141859 A1 | 6/2012 | Murata et al. | |
| 2013/0236793 A1 | 9/2013 | Takagi et al. | |
| 2014/0163158 A1 | 6/2014 | Terada et al. | |
| 2014/0272532 A1 | 9/2014 | Park et al. | |
| 2015/0030933 A1 | 1/2015 | Goetzen et al. | |
| 2015/0210785 A1 | 7/2015 | Nummila-Pakarinen et al. | |
| 2015/0325830 A1 | 11/2015 | Li et al. | |
| 2016/0126518 A1 | 5/2016 | Park et al. | |
| 2016/0126520 A1 | 5/2016 | Mizuno et al. | |
| 2016/0190532 A1 | 6/2016 | Zhao et al. | |
| 2016/0301055 A1 | 10/2016 | Lee et al. | |
| 2017/0077473 A1 | 3/2017 | Zhao et al. | |
| 2017/0263907 A1 | 9/2017 | Ameyama et al. | |
| 2017/0342232 A1 | 11/2017 | Haruta et al. | |
| 2018/0358147 A1 | 12/2018 | Matsumura et al. | |
| 2020/0035972 A1 | 1/2020 | Ahn et al. | |

FOREIGN PATENT DOCUMENTS

| | | | | |
|---|---|---|---|---|
| CN | 101287772 A | 10/2008 | | |
| CN | 101313018 A | 11/2008 | | |
| CN | 101434708 A | 5/2009 | | |
| CN | 101595168 A | 12/2009 | | |
| CN | 101983445 A | 3/2011 | | |
| CN | 102405095 A | 4/2012 | | |
| CN | 102412377 A | 4/2012 | | |
| CN | 102751459 A | 10/2012 | | |
| CN | 102779965 A | 11/2012 | | |
| CN | 102888016 A | 1/2013 | | |
| CN | 103328209 A | 9/2013 | | |
| CN | 103441229 A | 12/2013 | | |
| CN | 103748387 A | 4/2014 | | |
| CN | 104350071 A | 2/2015 | | |
| CN | 104428921 A | 3/2015 | | |
| CN | 104538576 A | 4/2015 | | |
| CN | 104701479 A * | 6/2015 | ........... | H01M 50/40 |
| CN | 104969305 A | 10/2015 | | |
| CN | 105579519 A | 5/2016 | | |
| CN | 106104850 A | 11/2016 | | |
| CN | 106328862 A | 1/2017 | | |
| CN | 106486632 A | 3/2017 | | |
| CN | 106661264 A | 5/2017 | | |
| CN | 108192116 A | 6/2018 | | |
| CN | 108198986 A | 6/2018 | | |
| DE | 102012000910 A1 | 7/2013 | | |
| EP | 2562767 A1 | 2/2013 | | |
| EP | 2908364 A1 | 8/2015 | | |
| EP | 3181621 A1 | 6/2017 | | |
| EP | 3340342 A1 | 6/2018 | | |
| EP | 3719061 A1 | 10/2020 | | |
| JP | S64-75005 A | 3/1989 | | |
| JP | H09-216964 A | 8/1997 | | |
| JP | 11144700 A * | 5/1999 | | |
| JP | H11-144700 A | 5/1999 | | |
| JP | 11172036 A * | 6/1999 | | |
| JP | H11-172012 A | 6/1999 | | |
| JP | H11-172036 A | 6/1999 | | |
| JP | 2000-319441 A | 11/2000 | | |
| JP | 2001176484 A * | 6/2001 | | |
| JP | 2002-249742 A | 9/2002 | | |
| JP | 2003-187777 A | 7/2003 | | |
| JP | 2005-008813 A | 1/2005 | | |
| JP | 2005-162902 A | 6/2005 | | |
| JP | 2006-092848 A | 4/2006 | | |
| JP | 2006-179273 A | 7/2006 | | |
| JP | 2007-299612 A | 11/2007 | | |
| JP | 2008-066193 A | 3/2008 | | |
| JP | 2009-070620 A | 4/2009 | | |
| JP | 2011-000832 A | 1/2011 | | |
| JP | 2011-005670 A | 1/2011 | | |
| JP | 2011-071128 A | 4/2011 | | |
| JP | 2011-074187 A | 4/2011 | | |
| JP | 2013-008690 A | 1/2013 | | |
| JP | 2013-173930 A | 9/2013 | | |
| JP | 2014-179321 A | 9/2014 | | |
| JP | 2015-070071 A | 4/2015 | | |
| JP | 2015-079588 A | 4/2015 | | |
| JP | 2015-199828 A | 11/2015 | | |
| JP | 2016-072150 A | 5/2016 | | |
| JP | 2016-219358 A | 12/2016 | | |
| JP | 2017-103206 A | 6/2017 | | |
| JP | 2017-203145 A | 11/2017 | | |
| JP | 2018-101613 A | 6/2018 | | |
| KR | 10-2011-0063656 A | 6/2011 | | |
| KR | 10-2013-0075790 A | 7/2013 | | |
| KR | 10-2016-0129580 A | 11/2016 | | |
| KR | 10-2016-0129583 A | 11/2016 | | |
| KR | 10-2016-0131761 A | 11/2016 | | |
| KR | 2016131761 A * | 11/2016 | ........... | H01M 10/052 |
| KR | 10-2016-0146134 A | 12/2016 | | |
| KR | 10-2017-0019345 A | 2/2017 | | |
| KR | 10-2017-0044996 A | 4/2017 | | |
| KR | 10-2017-0101230 A | 9/2017 | | |
| KR | 10-2018-0033487 A | 4/2018 | | |
| KR | 10-2018-0102408 A | 9/2018 | | |
| WO | 97/44839 A1 | 11/1997 | | |
| WO | 2006/101968 A2 | 9/2006 | | |
| WO | 2006/102016 A2 | 9/2006 | | |
| WO | 2008/041657 A1 | 4/2008 | | |
| WO | 2010/134585 A1 | 11/2010 | | |
| WO | 2014/057993 A1 | 4/2014 | | |
| WO | 2014/192862 A1 | 12/2014 | | |
| WO | 2015/059937 A1 | 4/2015 | | |
| WO | 2015/176480 A1 | 11/2015 | | |

OTHER PUBLICATIONS

Partial European Search Report issued in related European Patent Application No. 22169052.2 dated Aug. 4, 2022.
Partial European Search Report issued in related European Patent Application No. 22169036.5 dated Aug. 16, 2022.
Extended European Search Report issued in related European Patent Application No. 22169029.0 dated Aug. 18, 2022.

(56) References Cited

OTHER PUBLICATIONS

Extended European Search Report issued in related European Patent Application No. 23157951.7 dated Aug. 2, 2023.
Extended European Search Report issued in European Patent Application No. 23166690.0 dated Oct. 9, 2023.
Extended European Search Report issued in European Patent Application No. 23176156.0 dated Sep. 28, 2023.
Extended European Search Report issued in European Patent Application No. 23176142.0 dated Oct. 9, 2023.
Extended European Search Report issued in European Patent Application No. 23176153.7 dated Sep. 28, 2023.
Extended European Search Report issued in European Patent Application No. 23176183.4 dated Sep. 26, 2023.
Van der Weij, "The Action of Tin Compounds in Condensation-type RTV Silicone Rubbers," Macromolecular Chemistry, 181, 2541-2548 (1980).
International Search Report issued in corresponding International Patent Application No. PCT/JP2019/040342 dated Dec. 10, 2019.
Supplementary European Search Report issued in related European Patent Application No. 19870116.1 dated Nov. 29, 2021.
Supplementary European Search Report issued in corresponding European Patent Application No. 19871776.1 dated Nov. 15, 2021.
International Preliminary Report on Patentability and Written Opinion issue in corresponding International Patent Application No. PCT/JP2019/040342 dated Apr. 8, 2021.
Koyama, "Measurement of Physical Properties of Polymeric Materials under High Pressure," The review of high pressure science and technology, 5 (4): 224-231 Sep. 30, 1996 (see English abstract).
Extended European Search Report issued in related European Patent Application No. 22169042.3 dated Aug. 18, 2022.
Extended European Search Report issued in European Patent Application No. 24159635.2 dated May 7, 2024.
Paajanen et al., "Crystallization of cross-linked polyethylene by molecular dynamics simulation," Polymer, 171: 80-86 (2019).
Perrin et al., "Sorption and Diffusion of Solvent Vapours in Poly(vinylalcohol) Membranes of Different Crystallinity Degrees," Polymer International, vol. 39 (3): 251-260 (1996).
Supplementary European Search Report issued in European Patent Application No. 24174823.5 dated Jul. 30, 2024.
Office Action issued in U.S. Appl. No. 17/849,120 dated Jun. 26, 2024.

* cited by examiner

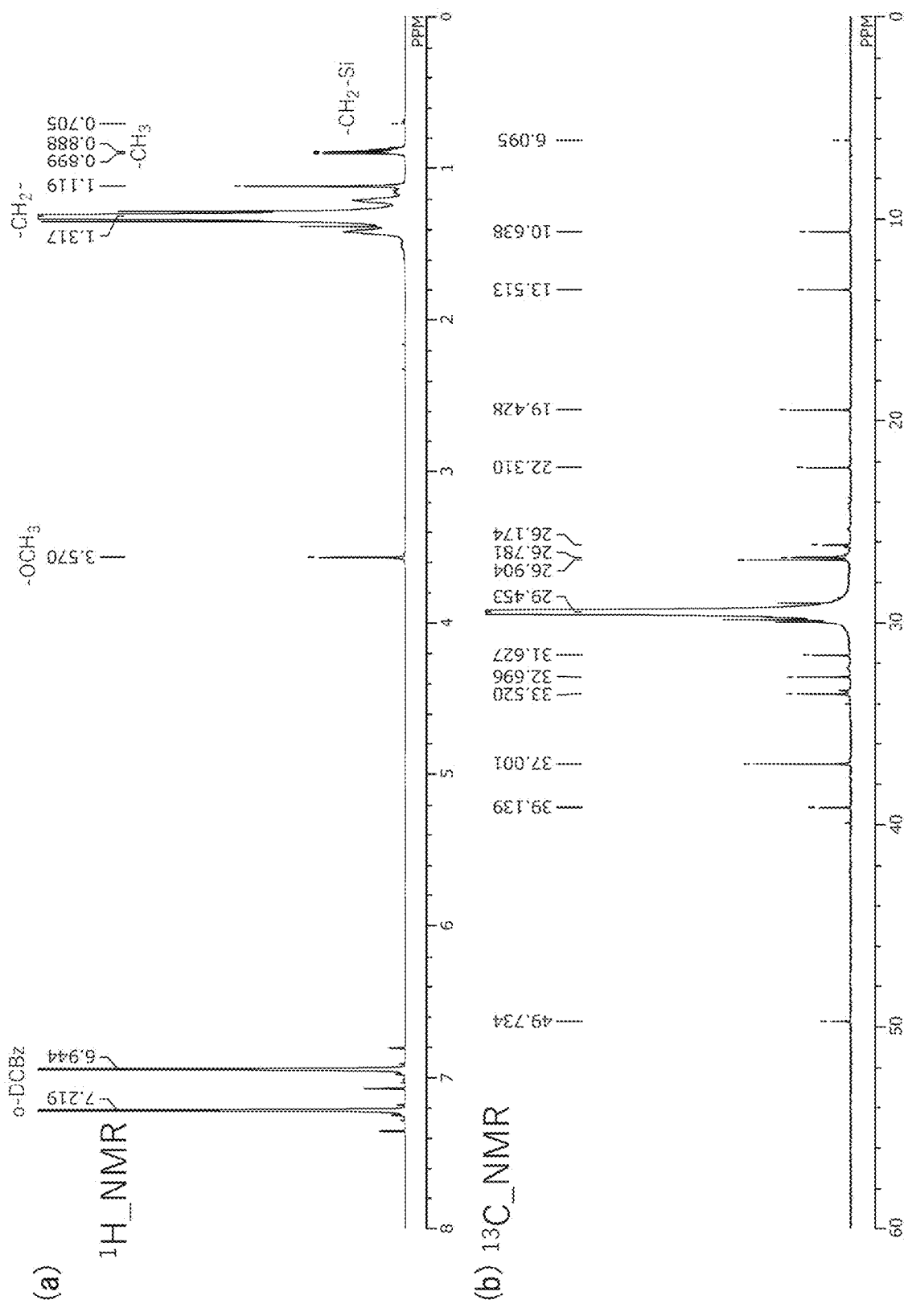

SEPARATOR HAVING SILANE-MODIFIED POLYOLEFIN AND POLYETHYLENE, AND METHOD FOR PRODUCING THE SAME

FIELD

The present invention relates to a separator for an electricity storage device and a method for producing it, and more specifically it relates to a modified polyolefin-containing a microporous membrane that can be suitably used as a separator for a lithium ion battery, and to a method for producing it.

BACKGROUND

Microporous membranes are widely used as membranes for separation or selective permeation and selection of various substances and as isolating materials, and some examples of their uses include as microfiltration membranes, as fuel cell and condenser separators, or as matrices for functional membranes or battery separators, which exhibit new functions by having functional materials packed into their pores. Polyolefin microporous membranes, specifically, are preferred for use as separators for lithium ion batteries that are widely utilized in PC laptops, cellular phones and digital cameras. In order to ensure battery safety, separators must have both an active shutdown function and high membrane rupture temperature. PTL 1, for example, describes adjustment of the higher physical properties of a polyolefin resin as an essential component of a separator for a lithium ion battery. In addition, as described in PTL 2, it is known that heat release due to interior battery short circuiting is inhibited by a shutdown function when the degree of crystallinity and gel fraction are in specific ranges, and that the safety of a battery can be ensured if it has performance such that a membrane rupture will not occur in the battery cell at partial high temperature sections (i.e. breakdown at 170° C. or higher). More specifically, in regard to PTLs 1 and 2, it has gradually come to light by experimentation that high-temperature membrane rupture properties can be exhibited by constructing silane crosslinked sections (a gel structure) in a polyolefin separator.

CITATION LIST

Patent Literature

[PTL 1] Japanese Unexamined Patent Publication No. H09(1997)-216964
[PTL 2] International Patent Publication No. WO97/44839
[PTL 3] Japanese Unexamined Patent Publication No. H11(1999)-144700
[PTL 4] Japanese Unexamined Patent Publication No. H11(1999)-172036
[PTL 5] Japanese Unexamined Patent Publication No. 2001-176484
[PTL 6] Japanese Unexamined Patent Publication No. 2000-319441
[PTL 7] Japanese Unexamined Patent Publication No. 2017-203145
[PTL 8] International Patent Publication No. WO2010/134585
[PTL 9] Japanese Unexamined Patent Publication No. 2016-072150
[PTL 10] Japanese Unexamined Patent Publication No. 2007-299612

SUMMARY

Technical Problem

With the increasing high outputs and high energy densities of lithium ion secondary batteries for mobile devices and vehicles in recent years, there is ongoing demand for smaller battery cell sizes and for stable cycle charge-discharge performance during long periods of use. It is therefore considered necessary for the separators used to be thin-membranes (for example, 15 µm or smaller) with high quality (for example, homogeneous physical properties and free of resin aggregates). Standards have also become more rigorous for battery safety in addition to the performance mentioned above, and as also described in PTLs 1 and 2, there is a need for shutdown functions and high-temperature membrane rupture properties, while expectations are also high for development of separator resin compositions that can be stably produced, and production methods for them. In this regard, the level for shutdown temperature is preferably as far below 150° C. as possible, while the membrane rupture temperature is preferably as high a temperature as possible.

In the method described in PTL 3, for example, a crosslinking catalyst master batch is used during the extrusion step to promote silane-modified polyethylene crosslinking reaction in the extruder, but this results in generation of resin aggregates and lowers the homogeneity of the physical properties of the separator. As a solution for this problem, the methods described in PTLs 4, 5 and 6 propose providing a plasticizer extraction step or silane gel crosslinking step, or controlling the gel fraction of the resin membrane, or dewatering after casting of the uncrosslinked resin through hot water. In addition, PTL 7 proposes a polyolefin microporous membrane with modification of the gel fraction, storage elastic modulus, maximum shrinkage factor based on thermomechanical analysis (TMA) and amount of radicals as measured by electron spin resonance (ESR), to provide a heat-resistant resin microporous membrane with low heat shrinkage, low fluidity and excellent meltdown resistance.

In addition, from the viewpoint of dimensional stability, and of both maintaining the shutdown function and increasing the membrane rupture temperature for separators for electricity storage devices, it has been proposed to provide an inorganic porous layer containing inorganic particles such as calcined kaolin or boehmite and a resin binder on at least one surface of a polyolefin microporous membrane (PTLs 8 and 9). A separator has also been proposed that has a layer A having a shutdown property and a layer B comprising an aramid resin and an inorganic material, with the ratio of their thicknesses adjusted to within a prescribed range (PTL 10).

However, the method disclosed in PTL 4 is not able to sufficiently promote silane crosslinking reaction, and it is difficult to obtain high-temperature membrane rupture resistance. Crosslinking reaction can be promoted in the plasticizer extraction steps described in PTLs 3 and 4 since they employ a tin(II)-based crosslinking catalyst, but there are concerns regarding post-residue of the crosslinking catalyst.

The heat-resistant resin microporous membrane described in PTL 7 is merely obtained by coating a photopolymerizable coating solution onto a dry porous membrane. In Example 5 of PTL 7 a low-molecular-weight silane coupling agent such as γ-methacryloxypropyltrimethoxysilane is added to the porous membrane, but when a low-molecular-weight silane coupling agent is used in a wet porous method, it is expected that the low-molecular-weight silane coupling agent does not bond with the resin of the porous membrane since it tends to react or bond with the pore-forming plasticizer.

Moreover, the film layer described in PTL 7 is formed by coating a compound with a polymerizable functional group onto a resin porous membrane followed by crosslinking reaction by external stimulation, and therefore some infiltration into the resin porous membrane is expected to occur during coating of the film layer, and a mixed region is expected to form near the interface between the film layer and the resin porous membrane after the crosslinking reaction has proceeded. This allows satisfactory TMA heat shrinkage performance to be obtained, but is also expected to lead to lower battery cycle characteristics due to blockage of the resin porous membrane, or reduced fuse (shutdown) performance as the resin porous membrane undergoes melting. In addition, small amounts of radical species compounds are detected by ESR and remain in the composite microporous membrane obtained by the method described in PTL 7, and when such a composite microporous membrane has been incorporated into a battery, radical reaction would be expected to take place with the other members and particularly the electrolyte solution, resulting in chain reaction that would decompose the electrolyte solution, thus potentially resulting in notable impairment of the battery performance.

A battery using a separator such as described in PTLs 3 to 7 has poor cycle characteristics, and when used for prolonged periods unpredictable secondary reactions may be induced in the battery, potentially lowering the battery safety. While silane crosslinking is problematic for obtaining a shutdown function and high-temperature membrane rupture properties as explained above, the porous body structure, which is the most important aspect of the separator, cannot be constructed with a silane-grafted polyolefin alone, and therefore the development of resin mixture compositions is also essential.

Furthermore, the microporous membranes and separators described in PTLs 1, 2 and 7 have been poorly studied in terms of placing inorganic porous layers comprising inorganic particles and a resin binder on their surfaces. A conventional separator comprising an inorganic porous layer on a microporous membrane will appear to have an improved membrane rupture temperature in the temperature-resistance curve of an electricity storage device. In practice, however, since the resin often elutes from the microporous membrane into the inorganic porous layer, loss of the membrane and a resulting reduction in stress resistance are to be expected for the separator as a whole. The multilayer porous membranes described in PTLs 8 and 9 are therefore provided with a polyolefin microporous membrane and an inorganic porous layer, but there is still room for investigation regarding both the low temperature shutdown function and high-temperature membrane rupture properties as a separator for an electricity storage device, and regarding improved electricity storage device cycle characteristics and battery nail penetration safety.

With the separators for electricity storage devices described in PTLs 1, 2 and 10, there is still room for improvement from the viewpoint of improving their electricity storage device performance.

In light of these problems, it is an object of the present invention to provide a separator that has both a shutdown function and high-temperature membrane rupture properties, and that can improve the electricity storage device output, cycle characteristic and/or safety, as well as a method for producing it.

Solution to Problem

As a result of much avid research directed toward solving these problems, the present inventors have completed this invention upon finding that they can be solved if crosslinking reaction (gelation) is carried out under specific conditions after completion of a step in which the higher-order structure of the microporous membrane is constructed using a resin composition with a specific resin composition.

Specifically, the present invention provides the following.

[1]

A method for producing a separator for an electricity storage device, comprising the following steps:
(1) a sheet-forming step in which a silane graft-modified polyolefin, polyethylene and a plasticizer are extruded into a sheet using an extruder, cooled to solidification and shaped into a molded sheet;
(2) a stretching step in which the molded sheet is subjected to biaxial stretching to a 20-fold to 250-fold area increase to form a stretched sheet;
(3) a porous body-forming step in which the plasticizer is extracted from the stretched sheet to form a porous body;
(4) a heat treatment step in which the porous body is subjected to heat treatment and subjected to stretching and relaxation in the transverse direction to obtain a heat-treated porous body;
(5) an affinity treatment step in which the heat-treated porous body is immersed in an organic solvent that is amphiphilic for water and organic materials, and the liquid affinity of the heat-treated porous body is increased to obtain an affinity-treated porous body impregnated with the organic solvent;
(6) a crosslinking step in which the affinity-treated porous body is contacted with a mixture of an organometallic catalyst and water, or is immersed in a base solution or an acid solution and subjected to silane dehydration condensation reaction to form oligosiloxane bonds, obtaining a crosslinked porous body; and
(7) a washing and drying step in which the crosslinked porous body is washed with water and dried.

[2]

The method for producing a separator for an electricity storage device according to [1] above, wherein the weight ratio of the silane graft-modified polyolefin and the polyethylene (silane graft-modified polyolefin weight/polyethylene weight) is 0.05/0.95 to 0.40/0.60.

[3]

The method for producing a separator for an electricity storage device according to [1] or [2] above, wherein the separator for an electricity storage device comprises a microporous membrane having a melted membrane rupture temperature of 180° C. to 220° C. as measured by thermomechanical analysis (TMA).

[4]

The method for producing a separator for an electricity storage device according to any one of [1] to [3] above, wherein in the crosslinking step, the affinity-treated porous body is immersed in the base solution or acid solution.

[5]
The method for producing a separator for an electricity storage device according to [4] above, wherein in the crosslinking step, the affinity-treated porous body is immersed in the base solution.

[6]
The method for producing a separator for an electricity storage device according to [5] above, wherein the temperature of the base solution is 20° C. to 100° C. and the pH thereof is 8 to 14.

[7]
The method for producing a separator for an electricity storage device according to [4] above, wherein in the crosslinking step, the affinity-treated porous body is immersed in the acid solution.

[8]
The method for producing a separator for an electricity storage device according to any one of [1] to [7] above, wherein the metal of the organometallic catalyst is one or more selected from the group consisting of scandium, vanadium, copper, zinc, zirconium, palladium, gallium, tin, titanium, iron, nickel and lead.

[9]
The method for producing a separator for an electricity storage device according to any one of [1] to [8] above, wherein the content of the scandium, vanadium, copper, zinc, zirconium, palladium, gallium, tin, titanium, iron, nickel or lead in the separator for an electricity storage device is 0.10 ppm to 200 ppm as the total in terms of atoms.

[10]
The method for producing a separator for an electricity storage device according to any one of [1] to [9] above, wherein the silane graft-modified polyolefin is not a master batch resin containing a dehydrating condensation catalyst that crosslinks the silane graft-modified polyolefin before the sheet-forming step.

[11]
The method for producing a separator for an electricity storage device according to any one of [1] to [10] above, wherein in the washing and drying step, the crosslinked porous body is washed with water at a temperature of 20 to 100° C. and a pH of 6 to 8 and dried.

[12]
A method for producing an electricity storage device, comprising the following steps:
  a step of laminating and/or winding a positive electrode, a separator for an electricity storage device obtained by the method for producing a separator for an electricity storage device according to any one of [1] to [11] above, and a negative electrode, to obtain a laminated stack or wound body;
  a step of inserting the laminated stack or wound body into an exterior body;
  a step of pouring an electrolyte solution into the exterior body; and
  a step of connecting lead terminals to the positive electrode and negative electrode.

[13]
The method for producing an electricity storage device according to [12] above, wherein the electrolyte solution includes a $LiPF_6$-containing electrolyte or another fluorine (F)-containing lithium salt electrolyte.

[14]
A separator for an electricity storage device that comprises a microporous membrane including a silane-modified polyolefin and polyethylene, wherein the melted membrane rupture temperature of the microporous membrane is 180° C. to 220° C. as measured by thermomechanical analysis (TMA).

[15]
The separator for an electricity storage device according to [14] above, wherein the separator for an electricity storage device includes scandium, vanadium, copper, zinc, zirconium, palladium, gallium, tin, titanium, iron, nickel or lead at 0.10 ppm to 200 ppm as the total in terms of atoms.

[16]
The separator for an electricity storage device according to [14] or [15] above, wherein the separator for an electricity storage device includes zinc or tin at 0.10 ppm to 200 ppm as the total in terms of atoms.

[17]
The separator for an electricity storage device according to any one of [14] to [16] above, which comprises:
  the microporous membrane and
  an inorganic porous layer that includes inorganic particles and a resin binder, disposed on at least one surface of the microporous membrane.

[18]
The separator for an electricity storage device according to [17] above, wherein the content of the inorganic particles in the inorganic porous layer is 5 weight % to 99 weight %.

[19]
The separator for an electricity storage device according to [17] or [18] above, wherein the content of the silane-modified polyolefin in the microporous membrane is 0.5 weight % to 40 weight %.

[20]
The separator for an electricity storage device according to any one of [17] to [19] above, wherein the inorganic particles are one or more selected from the group consisting of alumina ($Al_2O_3$), silica, titania, zirconia, magnesia, ceria, yttria, zinc oxide, iron oxide, silicon nitride, titanium nitride, boron nitride, silicon carbide, aluminum hydroxide oxide (AlO(OH)), talc, kaolinite, dickite, nacrite, halloysite, pyrophyllite, montmorillonite, sericite, mica, amesite, bentonite, asbestos, zeolite, diatomaceous earth, quartz sand and glass fibers.

[21]
The separator for an electricity storage device according to any one of [17] to [20] above, wherein the glass transition temperature (Tg) of the resin binder is −50° C. to 100° C.

[22]
A separator for an electricity storage device comprising a first porous layer (layer A) with a crosslinked structure that includes a silane-modified polyolefin, and a second porous layer (layer B) that includes inorganic particles, wherein:
  the ratio of the thickness (TA) of layer A with respect to the thickness (TB) of layer B (TA/TB) is 0.22 to 14.

[23]
The separator for an electricity storage device according to [22] above, wherein the membrane rupture temperature of layer A is 180° C. to 220° C., as measured by thermomechanical analysis (TMA).

[24]
The separator for an electricity storage device according to [22] or [23], wherein the total thickness of layer A and layer B (TA+TB) is 3.0 μm to 22 μm.

[25]
The separator for an electricity storage device according to any one of [22] to [24], wherein the amount of the inorganic particles in layer B is 20 weight % to 99.5% weight % based on the total weight of layer B.

[26]
The separator for an electricity storage device according to any one of [22] to [25], wherein layer B includes a resin binder.

[27]
The separator for an electricity storage device according to any one of [22] to [26], wherein layer A further includes polyethylene as a polyolefin different from the silane-modified polyolefin.

[28]
The separator for an electricity storage device according to any one of [22] to [27], wherein the amount of the silane-modified polyolefin in layer A is 3 weight % or greater based on the total weight of layer A.

[29]
A separator for an electricity storage device wherein the shutdown temperature is 130° C. to 160° C. and the meltdown temperature is 200° C. or higher, as measured based on the electrical resistance under pressure of 10.0 MPa.

[30]
A method for producing the separator for an electricity storage device according to any one of [14] to [29] above, comprising the following steps:
(1) a sheet-forming step in which a silane-modified polyolefin, polyethylene and a plasticizer are extruded into a sheet using an extruder, cooled to solidification and shaped into a molded sheet;
(2) a stretching step in which the molded sheet is subjected to biaxial stretching to a 20-fold to 250-fold area increase to form a stretched sheet;
(3) a porous body-forming step in which the plasticizer is extracted from the stretched sheet to form a porous body;
(4) a heat treatment step in which the porous body is subjected to heat treatment and subjected to stretching and relaxation in the transverse direction to obtain a heat-treated porous body;
(5) an affinity treatment step in which the heat-treated porous body is immersed in an organic solvent that is amphiphilic for water and organic materials, and the liquid affinity of the heat-treated porous body is increased to obtain an affinity-treated porous body impregnated with the organic solvent;
(6) a crosslinking step in which the affinity-treated porous body is contacted with a mixture of an organometallic catalyst and water, or is immersed in a base solution or an acid solution and subjected to silane dehydration condensation reaction to form oligosiloxane bonds, obtaining a crosslinked porous body;
(7) a washing and drying step in which the crosslinked porous body is washed with water and dried to obtain a microporous membrane comprising the silane-modified polyolefin; and
(8A) a coating step in which an inorganic porous layer including inorganic particles and a resin binder is formed on at least one surface of the microporous membrane.

[31]
An electricity storage device comprising an electrode, the separator for an electricity storage device according to any one of [14] to [29] above, and a nonaqueous electrolyte solution.

Advantageous Effects of Invention

According to the invention it is possible to provide both a shutdown function and high-temperature membrane rupture properties for a separator for an electricity storage device, and to improve the output, cycle characteristic and/or safety of the electricity storage device, and/or to inhibit generation of unmelted resin aggregates during the production process for the separator for an electricity storage device or to ensure high-temperature, high-pressure resistance.

BRIEF DESCRIPTION OF DRAWINGS

FIG. 6 is an $^1$H-NMR chart (a) and $^{13}$C-NMR chart (b) for the separator fabricated using silane-modified polyolefin starting material 1, shown in FIG. 4, in the state before crosslinking.

DESCRIPTION OF EMBODIMENTS

Figure 1:
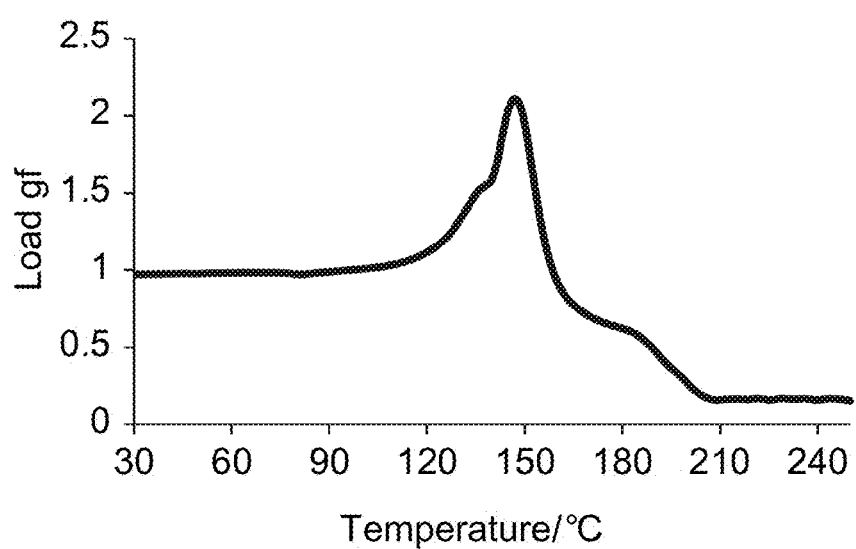
FIG. 1 is a TMA graph for the separator obtained in Example I-1.

Embodiments of the invention will now be explained. The present invention is not limited only to the following embodiments and may incorporate various modifications such as are within the scope of its gist.

Throughout the present specification, the "to" in a numerical range means that the numerical values on either side are included as the upper limit and lower limit. The upper limits and lower limits for the numerical ranges throughout the present specification may be combined as desired. For example, the upper limit of a preferred numerical range may be combined with the lower limit of a more preferred numerical range, or conversely, the upper limit of a more preferred numerical range may be combined with the lower limit of a preferred numerical range.

Throughout the present specification, "above", "upper" and "formed on a surface" do not mean that the positional relationship of the respective members is "directly above". For example, the expressions "layer B formed on layer A" and "layer B formed on the surface of layer A" do not exclude the case where an arbitrary layer not qualifying as either is included between layer A and layer B.

The properties of the microporous membrane alone that are described below may be measured after removing layers other than the microporous membrane (for example, an inorganic porous layer) from the separator for an electricity storage device.

<Separator for Electricity Storage Device>

One aspect of the invention is a separator for an electricity storage device (hereunder also referred to simply as "separator"). The separator, which must have an insulating property and ion permeability, will usually comprise an insulating material sheet with a porous body structure, a polyolefin nonwoven fabric or a resin microporous membrane. Particularly suited for a lithium ion battery is a polyolefin microporous membrane that allows construction of a compact homogeneous porous body structure with redox degradation resistance of the separator.

A microporous membrane is a membrane composed of a porous body, and its mean pore size is preferably 10 nm to 500 nm and more preferably 30 nm to 100 nm.

When the separator is included in an electricity storage device, the separator is removable from the electricity storage device.

First Embodiment

The separator according to a first embodiment of the invention comprises a microporous membrane wherein the melted membrane rupture temperature is 180° C. to 220° C. as measured by thermomechanical analysis (TMA), and the microporous membrane includes a silane-modified polyolefin and silane-unmodified polyethylene. From the viewpoint of high-temperature membrane rupture resistance and electricity storage device safety, the melted membrane rupture temperature of the microporous membrane is 180° C. to 220° C. and preferably 180° C. to 200° C., as measured by thermomechanical analysis (TMA). Even when the electricity storage device has generated abnormal heat release due to runaway reaction, the shutdown function of the separator is expected to stop movement of ions, and discharge in the electricity storage device or outside of the electricity storage device that results from it. It is expected that the electricity storage device as a whole is then cooled by a coolant, thus ensuring the safety. On the other hand, if the membrane rupture temperature of the microporous membrane is within the numerical range specified above, then the separator will undergo molten rupture and seep onto both electrodes so that the active materials can be coated, thus even more easily inhibiting heat release even when the electricity storage device as a whole is not sufficiently cooled, or even if an ultra-high temperature range is reached. The membrane rupture temperature of the microporous membrane can be measured by the method described in the Examples, and it can be controlled by changing the stretching temperature and/or stretch ratio during the production process.

From the viewpoint of the production process and of controlling the amorphous part of the microporous membrane to ensure safety, the separator of the first embodiment preferably has the content of scandium, vanadium, copper, zinc, zirconium, palladium, gallium, tin, titanium, iron, nickel or lead controlled to within a range of 0.10 ppm to 200 ppm as the total in terms of atoms, more preferably it has the content of zinc or tin controlled to within the range of 0.10 ppm to 200 ppm as the total in terms of atoms, and even more preferably it has their content controlled to within the range of 1 ppm to 150 ppm.

From the viewpoint of both a shutdown function at relatively low temperature and membrane rupture properties at relatively high temperature, as well as improved cycle characteristics and safety of the electricity storage device, the separator of the first embodiment may also comprise a microporous membrane; and an inorganic porous layer including inorganic particles and a resin binder, disposed on at least one surface of the microporous membrane. The separator may also employ the microporous membrane as a base material, and may consist of a composite of the base material and an inorganic coating layer.

Second Embodiment

The separator according to a second embodiment of the invention comprises a first porous layer (layer A) that has a crosslinked structure and includes a silane-modified polyolefin, and a second porous layer (layer B) that includes inorganic particles. Layer A and layer B are both either single layers or multiple layers. Layer B is formed on only one side or on both sides of layer A.

In a LIB, as a typical electricity storage device, lithium (Li) ions reciprocate between positive and negative electrodes. By situating a separator comprising layer A and layer B between the positive and negative electrodes, therefore, it is possible to cause relatively rapid movement of Li ions between the positive and negative electrodes, while avoiding contact between the positive and negative electrodes.

(Thickness Ratio)

Layer A functions as a crosslinkable microporous membrane, while layer B functions as an inorganic porous layer to be formed on the microporous membrane.

The ratio of the thickness (TA) of layer A with respect to the thickness (TB) of layer B (TA/TB) is 0.22 to 14. If the ratio (TA/TB) is 0.22 or greater it will be possible to adequately ensure the presence of layer A in the separator and to thus exhibit the function of layer A. If the ratio (TA/TB) is 14 or lower, it will be possible to adequately ensure the presence of layer B in the separator and to thus exhibit the function of layer B.

By forming layer A and layer B with their respective specific structures and setting the ratio (TA/TB) to be within this range, it is possible to provide a separator that can improve cycle characteristics and safety in an electricity storage device. The separator can be suitably used as a constituent material of a LIB for mounting in a mobile device or a vehicle.

From the viewpoint of this effect, the ratio (TA/TB) is preferably 0.8 or greater and more preferably 1.0 or greater. The ratio (TA/TB) is also preferably no higher than 5.5 and more preferably no higher than 3.2.

The ratio (TA/TB) may be set to be lower than 2.5, 2.0 or lower, or 1.0 or lower, for example. In this case, the thickness (TA) of layer A is less than 2.5 times the thickness (TB) of layer B, or even smaller than the thickness (TB) of layer B, thus allowing the layer A to be provided as a thinner membrane so that the separator thickness can be reduced.

The total thickness of layer A and layer B (TA+TB) is preferably 3.0 µm to 22 µm. If the total thickness (TA+TB) is 3.0 µm or greater the membrane strength of the separator will tend to be increased. If the total thickness (TA+TB) is 22 µm or smaller, on the other hand, the ion permeability of the separator will tend to be increased.

From the viewpoint of this effect, the total thickness (TA+TB) is more preferably 3.5 µm or greater and even more preferably 4.0 µm or greater. The total thickness (TA+TB) is also more preferably no greater than 20 µm and even more preferably no greater than 18 µm.

The total thickness (TA+TB) may be set to less than 11 µm, 10 µm or smaller or 8 µm or smaller, for example. Even with such a thin separator it is still possible to improve the cycle characteristics and safety of an electricity storage device, so long as the ranges of the invention are satisfied.

The ratio (TA/TB) and the total thickness (TA+TB) may each be measured by the methods described in the Examples, and they can be controlled by adjusting the thickness (TA) and/or the thickness (TB). Layer A and layer B will now be described.

(Shutdown Temperature and Meltdown Temperature)

Layer A preferably has a shutdown temperature (also referred to as the fuse temperature) of 130° C. to 160° C. and a meltdown temperature (also referred to as the membrane rupture temperature) of 200° C. or higher, as measured based on the electrical resistance under pressure of 0.1 MPa to 10.0 MPa (preferably under pressure of 10 MPa).

If the shutdown temperature is 130° C. or higher it will be possible to avoid unnecessary operation of the shutdown function during periods of normal reaction in the electricity storage device, and the electricity storage device can be ensured to have sufficient output characteristics. If the shutdown temperature is 160° C. or lower, on the other hand, the shutdown function can be suitably exhibited during periods of abnormal reaction in the electricity storage device.

In addition, a meltdown temperature of 200° C. or higher will be able to stop abnormal reaction before the ultra-high temperature range is reached during periods of abnormal reaction in the electricity storage device, and can prevent melting membrane rupture of the separator during periods of abnormal reaction of the electricity storage device.

In other words, if the shutdown temperature and meltdown temperature satisfy the conditions specified above, then it will be possible to obtain a separator that is able to provide an electricity storage device which is excellent in terms of heat resistance, pore occlusion property (shutdown function) and melting membrane rupture property (meltdown function), and to ensure the mechanical properties and ion permeability of the separator itself. With a separator whose shutdown temperature and meltdown temperature satisfy the aforementioned conditions, therefore, the electricity storage device can be designed with improved cycle characteristics and safety.

From the viewpoint of this effect, the shutdown temperature is preferably higher than 130° C., more preferably 135° C. or higher and even more preferably 136° C. or higher. The shutdown temperature is also preferably no higher than 150° C., more preferably no higher than 148° C. and even more preferably no higher than 146° C.

From the same viewpoint of this effect, the meltdown temperature is preferably 175° C. or higher, more preferably 178° C. or higher and even more preferably 180° C. or higher. The meltdown temperature is also preferably no higher than 230° C., more preferably no higher than 225° C. and even more preferably no higher than 220° C.

The condition of "a meltdown temperature of 200° C. or higher" is satisfied even when the meltdown temperature cannot be accurately measured in the range exceeding 200° C., so long as the temperature is 200° C. or higher.

The terms "shutdown temperature" and "meltdown temperature" as used herein are the values obtained upon measurement based on the electrical resistance under the pressure specified above. Specifically, the shutdown temperature and meltdown temperature are derived from the alternating-current resistance (alternating-current resistance between electrodes) that increases with increasing temperature of the laminated stack comprising the positive electrode, separator and negative electrode while applying the aforementioned pressure to the laminated stack. For the second embodiment, the shutdown temperature is the temperature at which the alternating-current resistance first exceeds a prescribed reference value (for example, 1000Ω), and the meltdown temperature is the temperature at which the alternating-current resistance exceeding the reference value falls below the reference value (for example, 1000Ω) as further heating is continued thereafter.

A hydraulic jack may be used for pressurizing of the laminated stack, but this is not restrictive, and any known pressurizing means other than a hydraulic jack may be used. An aluminum heater may be used for heating of the laminated stack, but this is also not restrictive, and any known heating means other than an aluminum heater may be used.

The shutdown temperature and meltdown temperature may be measured by the methods described in the Examples, and they can be controlled by adjusting the structure of and production method for layer A.

(Heat Shrinkage Factor at 150° C.)

The heat shrinkage factor (T2) at 150° C. after formation of the crosslinked structure in layer A is preferably 0.02 to 0.91 times the heat shrinkage factor (T1) at 150° C. before formation of the crosslinked structure. In other words, the ratio of the heat shrinkage factor (T2) at 150° C. after formation of the crosslinked structure in layer A with respect to the heat shrinkage factor (T1) at 150° C. before formation of the crosslinked structure (T2/T1) is preferably 0.02 to 0.91. The heat shrinkage factor used here is the larger value of the heat shrinkage factor in the machine direction (MD) of layer A and the heat shrinkage factor in the transverse direction (TD) of layer A.

It is because layer A is able to form a crosslinked structure with a silane-modified polyolefin, that it is possible to notice a change in heat shrinkage factor before and after crosslinking.

If the ratio (T2/T1) is 0.02 or greater it will be possible to effectively inhibit short circuiting, thereby reliably preventing temperature increase of the electricity storage device as a whole and consequent generation of fumes or ignition. It may be judged that crosslinking reaction in layer A has proceeded sufficiently if the ratio (T2/T1) is no greater than 0.91. That is, if the ratio (T2/T1) is within the range specified above, a separator for an electricity storage device can be provided that improves the cycle characteristics and safety for an electricity storage device.

From the viewpoint of this effect, the ratio (T2/T1) is preferably 0.03 or greater, more preferably 0.05 or greater and even more preferably 0.07 or greater. The ratio (T2/T1) is also preferably no greater than 0.7, more preferably no greater than 0.5 and even more preferably no greater than 0.4.

The heat shrinkage factor (T1) at 150° C. before formation of the crosslinked structure is preferably no higher than 70% and more preferably no higher than 60%.

The heat shrinkage factor (T2) at 150° C. after formation of the crosslinked structure is preferably no higher than 60% and more preferably no higher than 50%. Since formation of a crosslinked structure tends to result in a lower heat shrinkage factor compared to before formation of the crosslinked structure, the heat shrinkage factor (T2) will generally be a smaller value than the heat shrinkage factor (T1).

The heat shrinkage factor at 150° C. can be measured by the methods described in the Examples, and they can be controlled by adjusting the structure of and production method for layer A.

The separators of the first and second embodiments are interchangeable and may also be combined with each other. The separators of the first and second embodiments may also optionally include a layer other than the microporous membrane and inorganic porous layer. The constituent elements of the separators of the first and second embodiments will now be described.

[Microporous Membrane]

The microporous membrane may be formed of a polyolefin or a modified polyolefin.

The microporous membrane includes a silane-modified polyolefin, and may optionally include other polyolefins. Due to the silane crosslinking property of the silane-modified polyolefin, the microporous membrane is able to undergo crosslinking reaction during the production process for the separator.

The polyolefin to be included in the microporous membrane is not particularly restricted, and examples include ethylene or propylene homopolymers, and copolymers formed from two or more monomers selected from the group consisting of ethylene, propylene, 1-butene, 4-methyl-1-pentene, 1-hexene, 1-octene and norbornane. Among these, high-density polyethylene (homopolymer) or low-density polyethylene is preferred, and high-density polyethylene (homopolymer) is more preferred, from the viewpoint of allowing heat setting (also abbreviated as "HS") to be carried out at higher temperature while avoiding obstruction of the pores. A single polyolefin may be used alone, or two or more may be used in combination.

From the viewpoint of redox degradation resistance and obtaining a compact, homogeneous porous body structure, the microporous membrane is preferably produced using both a silane-modified polyolefin and ultrahigh molecular weight polyethylene (UHMWPE) as starting materials. The weight-average molecular weight of ultrahigh molecular weight polyethylene (UHMWPE) is generally known to be 1,000,000 or higher. More specifically, the weight ratio of the silane-modified polyolefin and UHMWPE during production of the microporous membrane or separator (silane-modified polyolefin weight/UHMWPE weight) is 0.05/0.95 to 0.40/0.60.

The content of the polyolefin in the microporous membrane is preferably 50 wt % to 100 wt %, preferably 70 wt % to 100 wt % or preferably 80 wt % to 100 wt %. The microporous membrane also preferably includes a polyolefin with a weight-average molecular weight of 100,000 or higher and less than 1,000,000 (included in a proportion of preferably 40 wt % or greater and more preferably 80 wt % or greater with respect to the entire polyolefin). The weight-average molecular weight of the polyolefin is more preferably 120,000 or higher and less than 950,000, and even more preferably 130,000 or higher and less than 930,000. By using a polyolefin having a weight-average molecular weight of 100,000 or higher and less than 1,000,000, relaxation of shrinkage of the polymer will take place early during a heating test of the electricity storage device, and in particular, safety will be more easily maintained in a heating safety test. By adjusting the weight-average molecular weight of the microporous membrane to lower than 1,000,000 it is possible to inhibit casting defects (film patterns) during extrusion, known as "melt fracture". By adjusting the weight-average molecular weight of the microporous membrane to 100,000 or higher, on the other hand, it is possible to inhibit transfer of recesses when the microporous membrane has been wound around a core (winding core).

The viscosity-average molecular weight of the microporous membrane during removal of the inorganic porous layer and during uncrosslinked treatment is preferably 100,000 to 1,200,000 and more preferably 150,000 to 800,000, from the viewpoint of avoiding generation of polymer powder by abrasive shear when the separator is transported by a roll.

The membrane thickness of the microporous membrane is preferably 1.0 µm or greater, more preferably 2.0 µm or greater and even more preferably 3.0 µm or greater, 4.0 µm or greater or 4.5 µm or greater. A microporous membrane thickness of 1.0 µm or greater will tend to result in increased membrane strength. The membrane thickness of the microporous membrane is also preferably no greater than 500 µm, more preferably no greater than 100 µm and more preferably no greater than 80 µm, no greater than 22 µm or no greater than 19 µm. A microporous membrane thickness of no greater than 500 µm will tend to result in increased ion permeability. The membrane thickness of the microporous membrane can be measured by the method described in the Examples.

[First Porous Layer (Layer A)]

Layer A includes a silane-modified polyolefin and has a crosslinked structure. From the viewpoint of ensuring degradation resistance against oxidation-reduction and ensuring a compact, homogeneous porous body structure, layer A preferably further includes polyethylene as a different polyolefin from the silane-modified polyolefin. Layer A may also include components other than the silane-modified polyolefin and polyethylene.

The polyolefin composing the silane-modified polyolefin in layer A may be a homopolymer of ethylene or propylene; or a copolymer formed from two or more monomers selected from the group consisting of ethylene, propylene, 1-butene, 4-methyl-1-pentene, 1-hexene, 1-octene and norbornane. Among these, the polyolefin is preferably ethylene homopolymer (polyethylene), more preferably high-density polyethylene and/or low-density polyethylene and even more preferably high-density polyethylene, from the viewpoint of allowing heat setting at higher temperature while avoiding obstruction of the pores. A single polyolefin may be used alone, or two or more may be used in combination.

Layer A may also include a polymer (another polymer) other than a silane-modified polyolefin or polyethylene, within a range that does not overly inhibit the effect of the invention.

The weight-average molecular weight of layer A as a whole is preferably 100,000 to 1,200,000 and more preferably 150,000 to 800,000.

(Thickness of Layer A)

The thickness (TA) of layer A is preferably 1 µm or greater, more preferably 2 µm or greater and even more preferably 3 µm or greater. If the thickness (TA) is 1 µm or greater the membrane strength will tend to be further increased. The thickness (TA) of layer A is also preferably 500 µm or smaller, more preferably 100 µm or smaller and even more preferably 80 µm or smaller. If the thickness (TA) is 500 µm or smaller the ion permeability will tend to be further increased. The thickness (TA) may be set to 1.00 µm or greater, 2.00 µm or greater or 3.00 µm or greater, for example.

When the separator is a separator for a LIB, the thickness (TA) is preferably less than 22 µm, more preferably no greater than 21 µm and even more preferably no greater than 20.5 µm. When the separator is a separator for a LIB the upper limit for the thickness (TA) may be set to less than 13 µm or no greater than 8.5 µm. If the thickness (TA) is 25 µm or smaller the ion permeability will tend to be further increased. The thickness (TA) may be set to less than 22.00 µm, 21.00 µm or smaller, 20.00 µm or smaller, less than 13.00 µm or 8.50 or smaller. The lower limit for the thickness (TA) may be the same as described above.

The thickness (TA) can be measured by the method described in the Examples, and it can be controlled by varying the stretch ratio of layer A.

When layer A is a single layer, the thickness of layer A is treated as the thickness (TA). When layer A consists of multiple layers, the total of the thicknesses of the multiple layers in layer A is treated as the thickness (TA).

The membrane rupture temperature of layer A is preferably 180° C. to 220° C., as measured by thermomechanical analysis (TMA). Even when the electricity storage device has generated abnormal heat release due to runaway reaction, the shutdown function of the separator is expected to stop movement of Li ions, and discharge in the electricity storage device or outside of the electricity storage device that results from it. It is expected that the electricity storage device as a whole is then cooled by a coolant, thus ensuring the safety. On the other hand, if the membrane rupture temperature of layer A is within the range specified above, then the separator will undergo molten rupture and seep onto both electrodes so that the active materials can be coated, thus even more easily inhibiting heat release even when the electricity storage device as a whole is not sufficiently cooled, or even if an ultra-high temperature range is reached.

The membrane rupture temperature of layer A can be measured by the method described in the Examples, and it can be controlled by changing the stretching temperature and/or stretch ratio of layer A.

[Porosity of Microporous Membrane or Layer A]

The porosity of the microporous membrane or layer A is preferably 20% or greater, more preferably 25% or greater, and even more preferably 28% or greater, 30% or greater, 32% or greater or 35% or greater. If the porosity is 20% or greater, its ability to follow rapid movement of Li ions will be further increased. The porosity is also preferably no greater than 90%, more preferably no greater than 80% and even more preferably no greater than 60%. If the porosity is no greater than 90%, the membrane strength will be further increased and self-discharge will tend to be inhibited. The porosity can be measured by the method described in the Examples, and it can be controlled by changing the stretching temperature and/or stretch ratio during the production process.

[Air Permeability of Microporous Membrane or Layer A]

The air permeability of the microporous membrane or layer A is preferably 1 second/100 $cm^3$ or greater, more preferably 50 seconds/100 $cm^3$ or greater, even more preferably 55 seconds/100 $cm^3$ or greater, and yet more preferably 70 seconds or greater, 90 seconds or greater or 110 seconds or greater. If the air permeability is 1 second/100 $cm^3$ or greater, the balance between the membrane thickness, porosity and mean pore size will tend to be improved. The air permeability is also preferably no greater than 400 seconds/100 $cm^3$, more preferably no greater than 300 seconds/100 $cm^3$ and even more preferably no greater than 270 seconds/100 $cm^3$. If the air permeability is no greater than 400 seconds/100 $cm^3$, the ion permeability will tend to be further increased. The air permeability can be measured by the method described in the Examples, and it can be controlled by changing the stretching temperature and/or stretch ratio during the production process.

[Puncture Strength of Microporous Membrane or Layer A]

The puncture strength of the microporous membrane or layer A is preferably 200 gf/20 μm or greater and more preferably 300 gf/20 μm or greater. If the puncture strength is 200 gf/20 μm or greater, then even if the active materials have dropped out when the laminated stack of the separator and electrodes has been wound, it will be easier to inhibit membrane rupture due to the dropped out active materials. It will also be possible to reduce the possibility of short circuiting caused by expansion and contraction of the electrodes during charge-discharge. The puncture strength of the microporous membrane or layer A is also preferably no greater than 4000 gf/20 μm and more preferably no greater than 3800 gf/20 μm. If the puncture strength is no greater than 3500 gf/20 μm, then it will be easier to reduce heat shrinkage during heating. The puncture strength can be measured by the method described in the Examples, and it can be controlled by changing the stretching temperature and/or stretch ratio during the production process.

[Tensile Strength of Microporous Membrane or Layer A]

The tensile strength of the microporous membrane or layer A is preferably 1000 $kgf/cm^2$ or greater, more preferably 1050 $kgf/cm^2$ or greater and even more preferably 1100 $kgf/cm^2$ or greater in both the MD (the lengthwise direction, machine direction or flow direction of the membrane or layer A) and the TD (the direction perpendicular to the MD, i.e. the transverse direction of the membrane or layer A). If the tensile strength is 1000 $kgf/cm^2$ or greater, then slitting or rupture during winding of the electricity storage device will tend to be further inhibited, or short circuiting due to contaminants in the electricity storage device will tend to be further inhibited. The tensile strength of the microporous membrane or layer A is also preferably no greater than 5000 $kgf/cm^2$, more preferably no greater than 4500 $kgf/cm^2$ and even more preferably no greater than 4000 $kgf/cm^2$. If the tensile strength is no greater than 5000 $kgf/cm^2$, then the microporous membrane or layer A will undergo earlier relaxation to exhibit weaker contractive force during heat testing, thus tending to result in higher safety.

[Tensile Modulus of Microporous Membrane or Layer A]

The tensile modulus of the microporous membrane or layer A is preferably no greater than 120 N/cm, more preferably no greater than 100 N/cm and even more preferably no greater than 90 N/cm, in both the MD and TD. A tensile modulus of no greater than 120 N/cm means that the separator for a lithium ion secondary battery is not excessively oriented, and for example, when the plugging agent such as polyethylene melts and shrinks in a heating test, it will tend to allow the polyethylene to undergo early stress relaxation, thereby preventing shrinkage of the separator in the battery and being more likely to prevent short circuiting between the electrodes (that is, it can improve the safety of the separator during heating). A low tensile modulus in this range is easily achieved by including polyethylene with a weight-average molecular weight of 500,000 or lower in the polyolefin forming the microporous membrane or layer A. The lower limit for the tensile modulus, on the other hand, is preferably 10 N/cm or greater, more preferably 30 N/cm or greater and even more preferably 50 N/cm or greater. The tensile modulus can be appropriately adjusted by adjusting the degree of stretching in the production process or by relaxation as necessary after stretching.

<Silane-Modified Polyolefin>

The silane-modified polyolefin has a structure with a polyolefin as the main chain and alkoxysilyl groups grafted onto the main chain. The silane-modified polyolefin can be obtained by grafting alkoxysilyl groups onto the main chain of a non-silane-modified polyolefin.

It is presumed that the alkoxysilyl groups are converted to silanol groups by water hydrolysis, and undergo crosslinking reaction to form siloxane bonds (with any proportion among structure T1, structure T2 and structure T3 in the following formula). Alkoxides substituting on the alkoxysilyl groups may be methoxide, ethoxide or butoxide. In the following formula, R may be methyl, ethyl, n-propyl, iso-propyl, n-butyl, sec-butyl, isobutyl or tert-butyl.

[Chemical Formula 1]

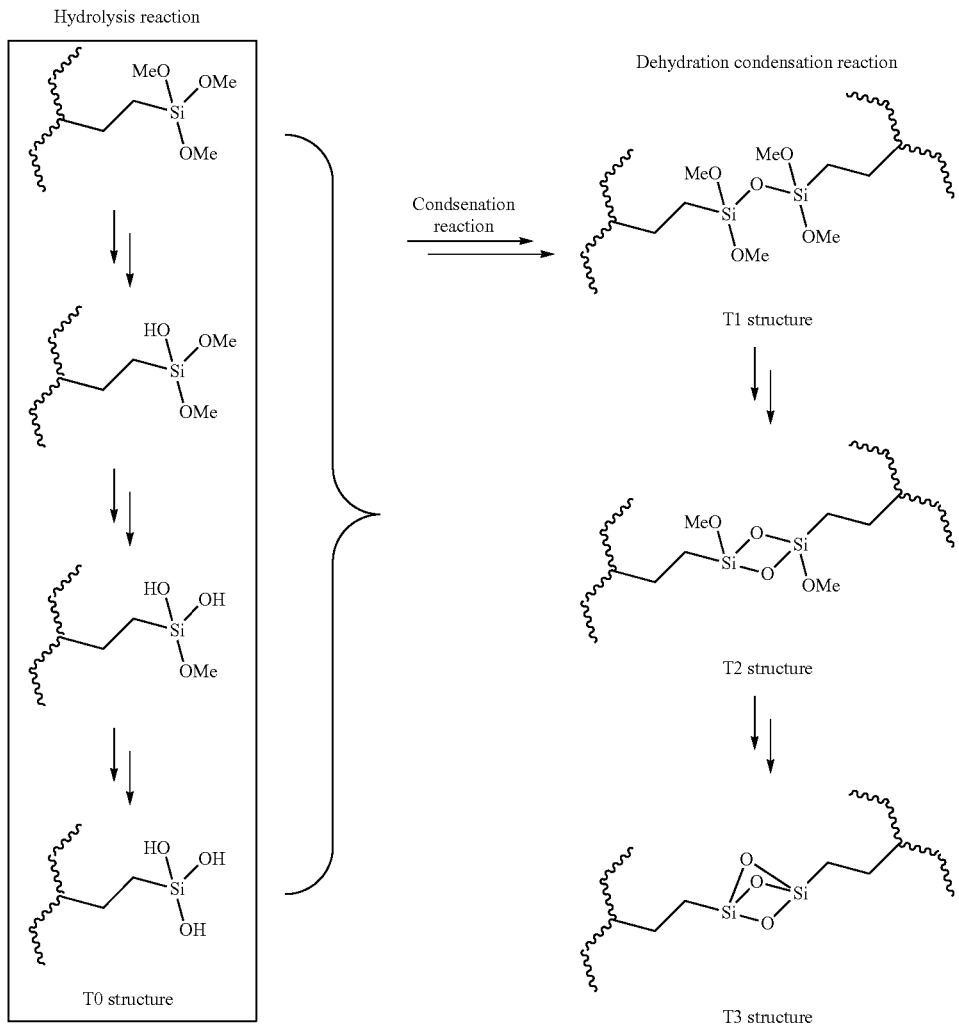

The main chain and grafts are linked by covalent bonding. The structure of the covalent bonding may be an alkyl, ether, glycol or ester structure. At the stage before the crosslinking reaction, the silane-modified polyolefin has a modification degree of no greater than 2% of silanol units with respect to the main chain ethylene units.

A preferred silane graft-modified polyolefin is one with a density of 0.90 to 0.96 g/cm$^3$ and a melt mass-flow rate (MFR) of 0.2 to 5 g/min at 190° C.

From the viewpoint of satisfactorily exhibiting the effect of the invention, the amount of silane-modified polyolefin is preferably 0.5 weight % or greater or 3 weight % or greater, more preferably 4 weight % or greater, and even more preferably 5 weight % or greater or 6 weight % or greater, based on the total weight of the microporous membrane or layer A. From the viewpoint of cycle properties and safety of the electricity storage device, the amount of silane-modified polyolefin is preferably no greater than 40 weight % and more preferably no greater than 38 weight %, based on the total weight of the microporous membrane. The amount of silane-modified polyolefin may also be 30 weight % or greater or 50 weight % or greater, or even 100 weight %, based on the total weight of layer A.

The crosslinked structure of the microporous membrane or layer A is preferably formed by an acid, a base or by swelling.

That is, the crosslinked structure in the microporous membrane or layer A is preferably a crosslinked structure obtained by immersing the treated product containing the silane-modified polyolefin in a base (base solution) or acid (acid solution) and carrying out silane dehydration condensation reaction to form oligosiloxane bonds. The crosslinked structure in this case is a crosslinked structure obtained by actively promoting crosslinking reaction during the production process for the microporous membrane, layer A or the separator.

(Polyethylene)

Throughout the present specification, the polyethylene that can be further included in addition to the silane-modified polyolefin (the polyethylene further included in the microporous membrane or layer A as a polyolefin different from the silane-modified polyolefin) is polyethylene that is ethylene homopolymer or an alkane unit-containing copolymer with a weight-average molecular weight of 100,000 to 10,000,000.

When the microporous membrane or layer A further includes polyethylene as a polyolefin different from the silane-modified polyolefin, its content is preferably 20 weight % or greater, more preferably 40 weight % or greater and even more preferably 50 weight % or greater, based on the total amount of the silane-modified polyolefin and polyethylene. If the polyethylene content is 20 weight % or greater it will tend to be easier to ensure degradation resistance against oxidation-reduction, and a compact, homogeneous porous body structure can be ensured.

The polyethylene content is also preferably no greater than 97 weight %, more preferably no greater than 96 weight % and even more preferably no greater than 95 weight %. If the polyethylene content is no greater than 97 weight % it will be possible to ensure the content of the silane-modified polyolefin in the microporous membrane or layer A.

(Detection Method for Silane-Modified Polyolefin in Separator)

When the silane-modified polyolefin in the separator is in a crosslinked state it is insoluble or has insufficient solubility in organic solvents, and it is therefore difficult to directly measure the silane-modified polyolefin content from the separator. In such cases, as pretreatment for the sample, methyl orthoformate which does not undergo secondary reactions may be used to decompose the siloxane bonds to methoxysilanol, and then solution NMR measurement may be carried out to detect the silane-modified polyolefin in the separator. The pretreatment experiment may be conducted with reference to Japanese Patent Publication No. 3529854 and Japanese Patent Publication No. 3529858.

Specifically, $^1$H or $^{13}$C NMR identification of the silane-modified polyolefin as the starting material used for production of the separator may be employed in the detection method for the silane-modified polyolefin in the separator. The following are examples of $^1$H— and $^{13}$C-NMR measurement methods.

($^1$H-Nmr Measurement)

The sample is dissolved in o-dichlorobenzene-d4 at 140° C. and a $^1$H-NMR spectrum is obtained at a proton resonance frequency of 600 MHz. The $^1$H-NMR measuring conditions are as follows.
Apparatus: AVANCE NEO 600 by Bruker
    Sample tube diameter: 5 mmφ
    Solvent: o-Dichlorobenzene-d4
    Measuring temperature: 130° C.
    Pulse angle: 30°
    Pulse delay time: 1 sec
    Number of scans: 1000
    Sample concentration: 1 wt/vol %
($^{13}$C-Nmr Measurement)

The sample is dissolved in o-dichlorobenzene-d4 at 140° C. and a $^{13}$C-NMR spectrum is obtained. The $^{13}$C-NMR measuring conditions are as follows.
Apparatus: AVANCE NEO 600 by Bruker
    Sample tube diameter: 5 mmφ
    Solvent: o-Dichlorobenzene-d4
    Measuring temperature: 130° C.
    Pulse angle: 30°
    Pulse delay time: 5 sec
    Number of scans: 10,000
    Sample concentration: 10 wt/vol %

Figure 4:
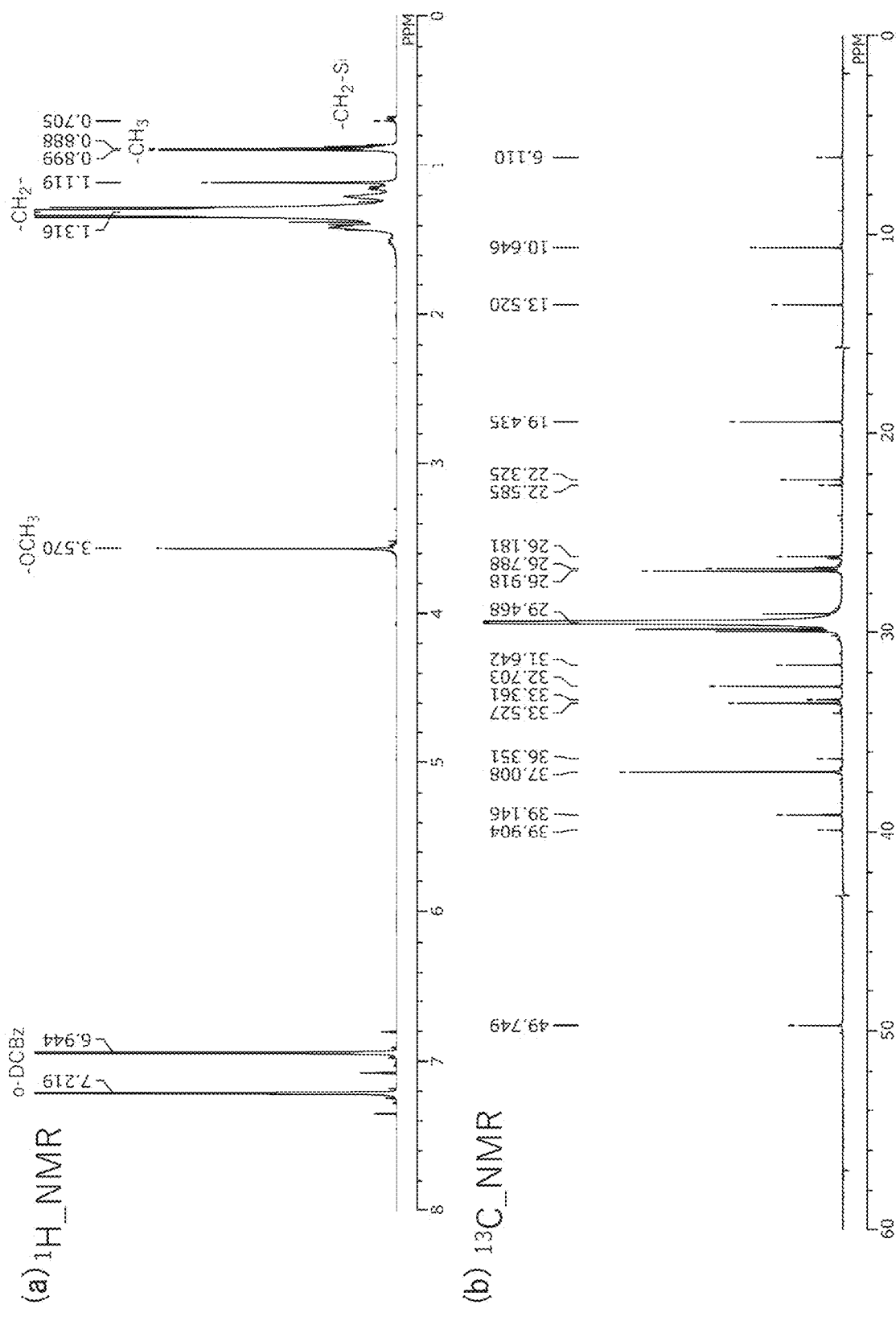
FIG. 4 is an $^1$H-NMR chart (a) and $^{13}$C-NMR chart (b) for silane-modified polyolefin starting material 1 obtained using a polyolefin.
Figure 5:
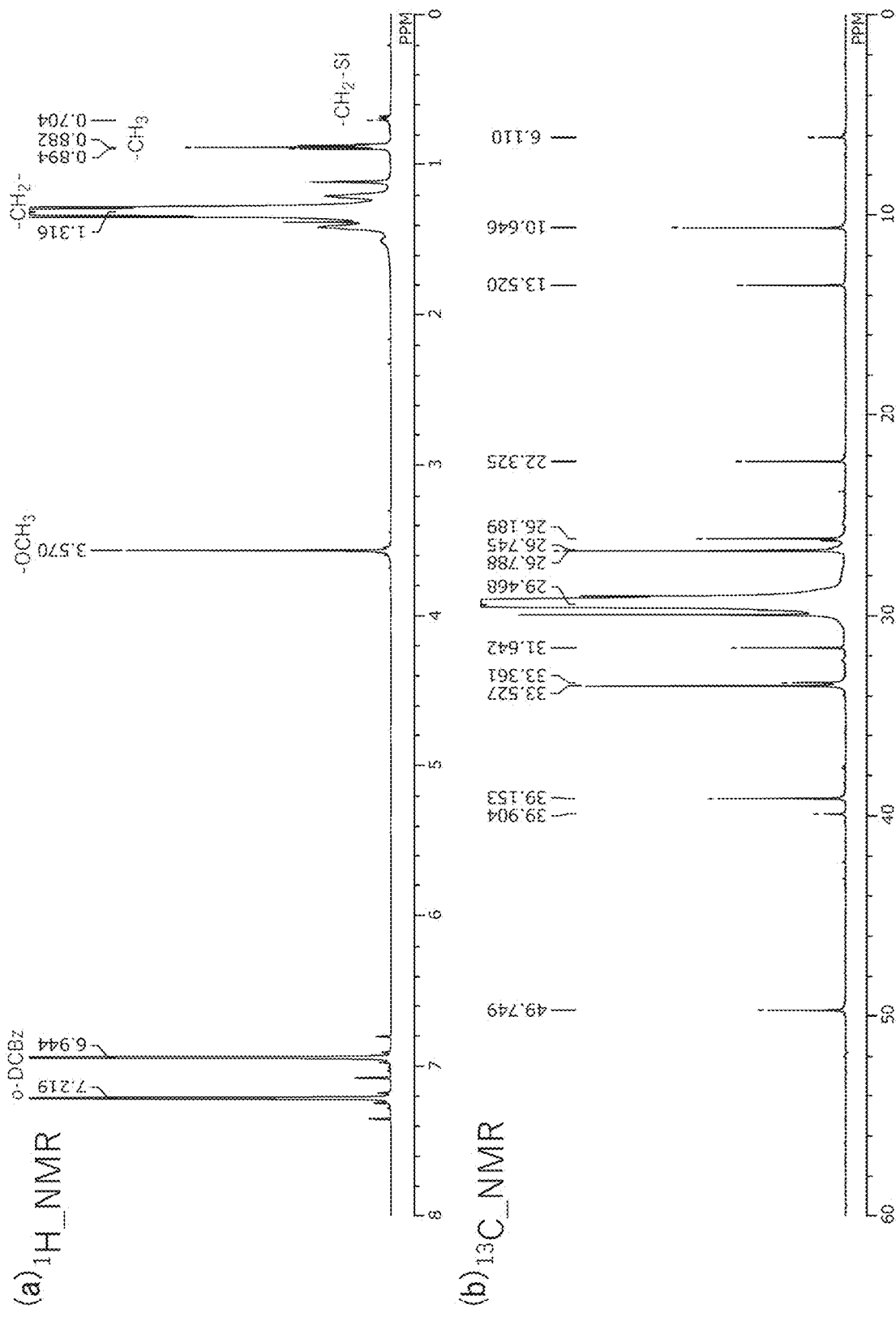
FIG. 5 is an $^1$H-NMR chart (a) and $^{13}$C-NMR chart (b) for silane-modified polyolefin starting material 2 obtained using a polyolefin.

FIGS. 4 and 5 are $^1$H and $^{13}$C-NMR charts for silane-modified polyolefin starting materials 1 and 2 using two types of polyolefins, where starting materials 1 and 2 each have a different melt index (MI), $C_3$ graft amount, $C_4$ graft amount and/or silanol-modified amount.

The $^1$H and $^{13}$C-NMR measuring conditions for FIG. 4 are as follows.
($^1$H-NMR Measuring Conditions)
    Apparatus: Bruker Avance NEO 600
    Observation nucleus: $^1$H
    Observation frequency: 600 MHz
    Pulse program: zg30
    Pulse delay time: 1 sec
    Number of scans: 1024
    Measuring temperature: 130° C.
    Chemical shift reference: 7.219 ppm (o-DCBz)
    Solvent: o-Dichlorobenzene-d4
    Sample concentration: 1 wt/vol %
    Sample tube: 5 mmφ
($^{13}$C-NMR Measuring Conditions)
    Apparatus: Bruker Avance NEO 600
    Observation nucleus: $^{13}$C
    Observation frequency: 150.91 MHz
    Pulse program: zgpg30
    Pulse delay time: 5 sec
    Number of scans: 24,000 or 12,800
    Measuring temperature: 130° C.
    Chemical shift reference: 132.39 ppm (o-DCBz)
    Solvent: o-Dichlorobenzene-d4
    Sample concentration: 10 wt/vol %
    Sample tube: 5 mmφ

The $^1$H and $^{13}$C-NMR measuring conditions for FIG. 5 are as follows.
($^1$H-NMR Measuring Conditions)
    Apparatus: Bruker Avance NEO 600
    Observation nucleus: $^1$H
    Observation frequency: 600 MHz
    Pulse program: zg30
    Pulse delay time: 1 sec
    Number of scans: 1024
    Measuring temperature: 130° C.
    Chemical shift reference: 7.219 ppm (o-DCBz)
    Solvent: o-Dichlorobenzene-d4
    Sample concentration: 1 wt/vol %
    Sample tube: 5 mmφ
($^{13}$C-NMR Measuring Conditions)
    Apparatus: Bruker Avance NEO 600
    Observation nucleus: $^{13}$C
    Observation frequency: 150.91 MHz
    Pulse program: zgpg30
    Pulse delay time: 5 sec
    Number of scans: 12800
    Measuring temperature: 130° C.
    Chemical shift reference: 132.39 ppm (o-DCBz)
    Solvent: o-Dichlorobenzene-d4
    Sample concentration: 10 wt/vol %
    Sample tube: 5 mmφ

FIG. 6 shows an $^1$H— and $^{13}$C-NMR chart of the separator fabricated using silane-modified polyolefin starting material 1, shown in FIG. 4, in the state before crosslinking. The $^1$H and $^{13}$C-NMR measuring conditions for FIG. 6 are as follows.
($^1$H-NMR Measuring Conditions)
    Apparatus: Bruker Avance NEO 600
    Observation nucleus: $^1$H
    Observation frequency: 600 MHz
    Pulse program: zg30
    Pulse delay time: 1 sec
    Number of scans: 1024
    Measuring temperature: 130° C.

Chemical shift reference: 7.219 ppm (o-DCBz)
Solvent: o-Dichlorobenzene-d4
Sample concentration: 1 wt/vol %
Sample tube: 5 mmφ
($^{13}$C-NMR Measuring Conditions)
Apparatus: Bruker Avance NEO 600
Observation nucleus: $^{13}$C
Observation frequency: 150.91 MHz
Pulse program: zgpg30
Pulse delay time: 5 sec
Number of scans: 24,000 or 12,800
Measuring temperature: 130° C.
Chemical shift reference: 132.39 ppm (o-DCBz)
Solvent: o-Dichlorobenzene-d4
Sample concentration: 10 wt/vol %
Sample tube: 5 mmφ

For the separator in the crosslinked state, measurement can be performed by NMR in the same manner as FIG. 6 after the pretreatment described above (not shown).

As shown in FIGS. 4 to 6, $^1$H and/or $^{13}$C NMR measurement allows the amount of silane unit modification and the amount of polyolefin alkyl group modification in the silane-modified polyolefin to be confirmed for a polyolefin starting material, and allows the silane-modified polyolefin contained in the separator to be determined (—CH$_2$—Si: $^1$H, 0.69 ppm, t; $^{13}$C, 6.11 ppm, s).

[Combination of Microporous Membrane and Inorganic Porous Layer]

A combination of a silane-modified polyolefin-containing microporous membrane and an inorganic porous layer will tend to provide both a shutdown function at lower temperatures than 150° C. and membrane rupture properties at relatively high temperature, and to improve the electricity storage device cycle characteristics and battery nail penetration safety. Since the silane-modified polyolefin in the microporous membrane has a silane crosslinking property, presumably silane crosslinking can result in increased viscosity of the resin in the microporous membrane, and therefore when compressive force is applied between the electrodes during a period of abnormal high temperature of the separator-containing electricity storage device, the crosslinked high-viscosity resin is less likely to flow into the inorganic layer (that is, integration is less likely), and the clearance between the electrodes can be adequately ensured and shorting of the battery can be inhibited.

[Inorganic Porous Layer]

The inorganic porous layer is a layer comprising inorganic particles and a resin binder, and optionally it may further comprise a dispersing agent that disperses the inorganic particles in the binder resin.

The thickness of the inorganic porous layer is preferably 0.5 μm to 10 μm, 0.5 μm to 7 μm, 0.5 μm to 5 μm or 0.5 μm to 4 μm, from the viewpoint of the ion permeability of the separator, and the charge-discharge capacity or cycle stability of the electricity storage device. The thickness of the inorganic porous layer can be determined by the method described in the Examples.

[Second Porous Layer (Layer B)]

Layer B comprises inorganic particles. Layer B may also comprise a resin binder. When layer B comprises inorganic particles and a resin binder, layer B may be an inorganic porous layer as described above. Layer B may also comprise components other than inorganic particles and a resin binder.

(Thickness of Layer B)

The thickness (TB) of layer B is preferably 0.2 μm or greater and more preferably 0.5 μm or greater. If the thickness (TB) is 0.5 μm or greater the mechanical strength will tend to be further increased. The thickness (TB) is also preferably smaller than 22 μm, more preferably 20 μm or smaller and even more preferably 15 μm or smaller. If the thickness (TB) is 30 μm or smaller, the volume of the electricity storage device occupied by the separator will be reduced, which will tend to be advantageous from the viewpoint of increasing the capacity of the electricity storage device. It is also preferred from the viewpoint of preventing excessive increase in the air permeability of the separator. The thickness (TB) may be set to 0.50 μm or greater, 0.80 μm or greater or 1.00 μm or greater, or set to smaller than 22.00 μm, 20.00 μm or smaller or 15.00 μm or smaller, for example.

The thickness (TB) can be measured by the method described in the Examples, and it can be controlled by varying the coating amount of the coating solution (slurry) used to form layer B.

When layer B is a single layer, the thickness of layer B is treated as the "thickness (TB)". When layer B is multi-layered, the total thickness of the multiple layers of layer B is treated as the "thickness (TB)".

When layer B is disposed on both one and the other side of layer A, the total thickness of the layer B disposed on the one side and the layer B disposed on the other side is treated as the "thickness (TB)".

(Inorganic Particles)

Examples for the inorganic particles include inorganic oxides (oxide-based ceramics) such as alumina (Al$_2$O$_3$), silica, titania, zirconia, magnesia, ceria, yttria, zinc oxide and iron oxide; inorganic nitrides (nitride-based ceramics) such as silicon nitride, titanium nitride and boron nitride; ceramics such as silicon carbide, calcium carbonate, magnesium sulfate, aluminum sulfate, aluminum hydroxide, aluminum hydroxide oxide (AlO(OH)), potassium titanate, talc, kaolinite, dickite, nacrite, halloysite, pyrophyllite, montmorillonite, sericite, mica, amesite, bentonite, asbestos, zeolite, calcium silicate, magnesium silicate, diatomaceous earth and quartz sand; and glass fibers. These may be used alone, or two or more may be used in combination.

From the viewpoint of ensuring heat resistance, the amount of inorganic particles is preferably 5 weight % or greater or 20 weight % or greater, and more preferably 30 weight % or greater, based on the total weight of the inorganic porous layer or layer B. The amount of inorganic particles may be set to 50 weight % or greater, greater than 80 weight % or 85 weight % or greater, based on the total weight of the inorganic porous layer or layer B. The amount of inorganic particles is also preferably no greater than 99.9 weight %, and more preferably no greater than 99.5 weight % or no greater than 99 weight %.

The amount of inorganic particles may be set 20.00 weight % or greater, 30.00 weight % or greater, 50.00 weight % or greater, greater than 80.00 weight % or 85.00 weight % or greater, and also set to no greater than 99.90 weight % or 99.50 weight %.

The form of the inorganic particles may be tabular, scaly, needle-like, columnar, spherical, polyhedral, fusiform or aggregated (block-shaped). Inorganic particles with these shapes may also be combined for use.

The number-mean particle size of the inorganic particles is preferably 0.01 μm or greater, 0.1 μm or greater, 0.3 μm or greater or 0.5 μm or greater. The number-mean particle size is also preferably no greater than 10.0 μm, no greater than 9.0 μm, no greater than 6.0 μm or no greater than 2.5 μm, more preferably no greater than 2.0 μm and even more preferably no greater than 1.5 μm, for example. Adjusting the number-mean particle size of the inorganic particles to within this range is preferred from the viewpoint of increasing the safety during short circuiting. The method of adjusting the number-mean particle size of the inorganic particles may be a method of pulverizing the inorganic particles using a suitable pulverizing apparatus such as a ball mill, bead mill or jet mill.

The particle size distribution of the inorganic particles is preferably 0.02 µm or greater, more preferably 0.05 µm or greater and even more preferably 0.1 µm or greater, as the minimum particle size. The maximum particle size is preferably no greater than 20 µm, more preferably no greater than 10 µm and even more preferably no greater than 7 µm. The maximum particle size/mean particle size ratio is preferably no greater than 50, more preferably no greater than 30 and even more preferably no greater than 20. Adjusting the particle size distribution of the inorganic particles to within this range is preferred from the viewpoint of inhibiting heat shrinkage at high temperature. Multiple particle size peaks may also be present between the maximum particle size and minimum particle size. The method of adjusting the particle size distribution of the inorganic particles may be, for example, a method of pulverizing the inorganic filler using a ball mill, bead mill or jet mill to adjust them to the desired particle size distribution, or a method of preparing multiple fillers with different particle size distributions and then blending them.

(Resin Binder)

The resin binder comprises a resin that binds together the inorganic particles. The glass transition temperature (Tg) of the resin binder is preferably −50° C. to 100° C. and more preferably −35° C. to 95° C., from the viewpoint of ensuring the binding property with the inorganic particles, and ensuring stability of the inorganic porous layer or layer B, during the production process for the separator, the production process for the electricity storage device or the charge-discharge process.

The glass transition temperature is determined from a DSC curve obtained by differential scanning calorimetry (DSC). Specifically, the value used for the glass transition temperature may be the temperature at the intersection between a straight line extending the low-temperature end baseline in the DSC curve toward the high-temperature end, and the tangent line at the inflection point in the stepwise change region of glass transition. More specifically, it may be determined by the method described in the Examples. Moreover, the "glass transition" refers to the value when a change in heat quantity accompanying the change in state of a polymer test piece in DSC occurs at the endothermic end. The change in heat quantity is observed in the form of a stepwise change in the DSC curve. A "stepwise change" is a portion of the DSC curve moving away from the previous low-temperature end baseline and toward a new high-temperature end baseline. A combination of a stepwise change and a peak is also included in the concept of "stepwise change". The "inflection point" is the point at which the slope of the DSC curve is maximum in the stepwise change region. If the exothermic end in the stepwise change region is defined as the top end, then this represents the point where the upwardly convex curve changes to a downwardly convex curve. The term "peak" refers to a portion of the DSC curve that moves away from the low-temperature end baseline and then returns to the same baseline. The term "baseline" refers to the DSC curve in the temperature zone where no transition or reaction takes place in the test piece.

Examples for the resin binder include the following 1) to 7), for example. These may be used alone, or two or more may be used in combination.

1) Polyolefins: Polyethylene, polypropylene, ethylene-propylene rubber and modified forms of these;
2) Conjugated diene-based polymers: For example, styrene-butadiene copolymers and their hydrogenated forms, acrylonitrile-butadiene copolymers and their hydrogenated forms and acrylonitrile-butadiene-styrene copolymers and their hydrogenated forms;
3) Acrylic-based polymers: For example, methacrylic acid ester-acrylic acid ester copolymers, styrene-acrylic acid ester copolymers and acrylonitrile-acrylic acid ester copolymers;
4) Polyvinyl alcohol-based resins: For example, polyvinyl alcohol and polyvinyl acetate;
5) Fluorine-containing resins: For example, PVdF, polytetrafluoroethylene, vinylidene fluoride-hexafluoropropylene-tetrafluoroethylene copolymer and ethylene-tetrafluoroethylene copolymer;
6) Cellulose derivatives: For example, ethyl cellulose, methyl cellulose, hydroxyethyl cellulose and carboxymethyl cellulose; and
7) Polymers that are resins with a melting point and/or glass transition temperature of 180° C. or higher, or without a melting point but having a decomposition temperature of 200° C. or higher: For example, polyphenylene ethers, polysulfones, polyethersulfones, polyphenylene sulfides, polyetherimides, polyamide-imides, polyamides and polyesters.

These types of resin binders can be obtained by known production methods such as emulsion polymerization or solution polymerization, using any desired monomers as the starting materials. The polymerization is not restricted in terms of the polymerization temperature, the pressure during polymerization, the method of adding the monomers and the additives used (polymerization initiator, molecular weight modifier and pH regulator, etc.).

The amount of resin binder is 0.5 weight % or greater or 1.0 weight % or greater, for example, and no greater than 50 weight % or no greater than 30 weight %, for example, based on the total weight of the inorganic porous layer or layer B. Since layer B has the resin binder as an optional component as mentioned above, the amount of resin binder in layer B may be less than 20 weight %, 15 weight % or less or 0 weight % based on the total weight of layer B. If the amount of resin binder in layer B is reduced, it will be possible to increase the amount of inorganic particles added to layer B by that amount.

(Dispersing Agent)

The dispersing agent is adsorbed onto the surfaces of the inorganic particles in the slurry to form the inorganic porous layer or layer B, thus stabilizing the inorganic particles by electrostatic repulsion and the like, and examples thereof include polycarboxylic acid salts, sulfonic acid salts, polyoxyethers and surfactants. The inorganic porous layer or layer B may also include other components commonly added to aqueous coating materials in addition to the components mentioned above, within the range of the aforementioned effect. Such other components include, but are not limited to, thickeners, membrane-forming aids, plasticizers, crosslinking agents, cryoprotectants, antifoaming agents, dyes, antiseptic agents, ultraviolet absorbers and light stabilizers, for example. Such other components may be used alone, or two or more may be used in combination.

(Additives)

The microporous membrane, inorganic porous layer, layer A and/or layer B may also include known additives as necessary. Examples of such additives include organometallic catalysts (dehydrating condensation catalysts); plasticizers; phenol-based, phosphorus-based and sulfur-based antioxidants; metal soaps such as calcium stearate and zinc stearate; thickeners; membrane-forming aids; crosslinking agents; cryoprotectants; antifoaming agents; antiseptic agents; ultraviolet absorbers; light stabilizers; antistatic agents; anti-fogging agents; dyes; and color pigments.

Layer B may also include a crosslinking agent. The crosslinking agent may include a functional group that reacts with the inorganic particles.

<Physical Properties of Separator>

When the separator is to be used in a relatively high-capacity lithium ion secondary battery, the membrane thickness of the separator as a whole is preferably no greater than 25 μm, more preferably no greater than 22 μm or no greater than 20 μm, even more preferably no greater than 18 μm and most preferably no greater than 16 μm. If the membrane thickness of the separator is no greater than 25 μm, the ion permeability will tend to be further increased. The lower limit for the membrane thickness of the separator as a whole may be 1.0 μm or greater, 3.0 μm or greater, 4.0 μm or greater, 6.0 μm or greater or 7.5 μm or greater, for example.

The air permeability of the separator is preferably 50 seconds/100 $cm^3$ to 400 seconds/100 $cm^3$, more preferably 75 seconds/100 $cm^3$ to 275 seconds/100 $cm^3$ and even more preferably 100 seconds/100 $cm^3$ to 200 seconds/100 $cm^3$. This is preferred because the separator will have suitable mechanical strength so long as the air permeability is 50 seconds/100 $cm^3$ or greater, and will have an improved battery characteristic from the viewpoint of permeability if the air permeability is 400 seconds/100 $cm^3$ or less.

<Electricity Storage Device>

The separator described above can be used in an electricity storage device. The electricity storage device comprises a separator according to the first embodiment, disposed between a plurality of electrodes, and an electrolyte solution. The electrodes are a positive electrode and a negative electrode, for example, with the separator preferably being disposed between the positive and negative electrodes. Specifically, the electricity storage device may be a lithium battery, lithium secondary battery, lithium ion secondary battery, sodium secondary battery, sodium ion secondary battery, magnesium secondary battery, magnesium ion secondary battery, calcium secondary battery, calcium ion secondary battery, aluminum secondary battery, aluminum ion secondary battery, nickel hydrogen battery, nickel cadmium battery, electrical double layer capacitor, lithium ion capacitor, redox flow battery, lithium sulfur battery, lithium-air battery or zinc air battery, for example. Preferred among these, from the viewpoint of practicality, are a lithium battery, lithium secondary battery, lithium ion secondary battery, nickel hydrogen battery or lithium ion capacitor, with a lithium battery or lithium ion secondary battery being more preferred.

<Lithium Ion Secondary Battery>

A lithium ion secondary battery is a battery employing a lithium transition metal oxide such as lithium cobaltate or a lithium cobalt composite oxide as the positive electrode, a carbon material such as graphite as the negative electrode, and an organic solvent containing a lithium salt such as $LiPF_6$ as the electrolyte solution. The electrolyte solution described above for the method of producing the separator may also be used in the lithium ion secondary battery. During charge and discharge of the lithium ion secondary battery, ionized lithium reciprocates between the electrodes. The separator is disposed between the electrodes since the ionized lithium must migrate between the electrodes relatively rapidly while contact between the electrodes is inhibited.

<Method for Producing Separator for Electricity Storage Device>

Another aspect of the invention is a method for producing a separator for an electricity storage device. The method for producing the separator may comprise a step of producing the microporous membrane or layer A, and optionally a step of producing an inorganic porous layer on the microporous membrane or a step of producing layer B on layer A. The materials used in the method for producing the separator may be those mentioned for the first or second embodiment, unless otherwise specified.

Third Embodiment

The method for producing a microporous membrane according to a third embodiment comprises the following steps:
 (1) a sheet-forming step;
 (2) a stretching step;
 (3) a porous body-forming step;
 (4) a heat treatment step;
 (5) an affinity treatment step;
 (6) a crosslinking step; and
 (7) a washing and drying step. Layer A described above can be formed by carrying out steps (1) to (7). If desired, the method for producing the microporous membrane according to the third embodiment may also include a kneading step before the sheet-forming step (1) and/or a winding step after the washing and drying step (7).

The method for producing a separator may also optionally include the following step in addition to steps (1) to (7):
 (8A) a step of coating the inorganic porous layer onto the silane-crosslinked microporous membrane.

Since the inorganic porous layer is coated in step (8A) onto the microporous membrane that has been silane-crosslinked in steps (1) to (7), this tends to improve the coatability onto the microporous membrane and the wettability of the microporous membrane in the separator production process.

[Kneading Step]

The kneading step is a step in which the silane graft-modified polyolefin and the other polyolefin are kneaded to obtain a kneaded blend. Polyethylene is preferably used together with the silane graft-modified polyolefin during the kneading step. The silane graft-modified polyolefin, the silane-unmodified polyethylene and the other polyolefin may be ones explained for the first embodiment. Optionally, the silane graft-modified polyolefin and a plasticizer may be kneaded during the kneading step.

In addition, in the kneading step it is preferred to use a polyolefin composition including a polyolefin with a weight-average molecular weight of lower than 1,000,000 (included in a proportion of preferably 40 weight % or greater and more preferably 80 weight % or greater with respect to the total polyolefin). By using a polyolefin having a weight-average molecular weight of lower than 1,000,000, relaxation of shrinkage of the polymer will take place early during a heating test of the electricity storage device, and in particular, safety will be more easily maintained in a heating safety test. When a polyolefin with a weight-average molecular weight of lower than 1,000,000 is used, the elastic modulus in the thickness direction of the obtained microporous membrane tends to be lower compared to when a polyolefin of 1,000,000 or higher is used, and therefore a microporous membrane is obtained with relatively easier transfer of core irregularities.

The polyolefin composition used in the kneading step may contain publicly known additives such as a dehydrating condensation catalyst, a plasticizer, a metal soap such as calcium stearate or zinc stearate, an ultraviolet absorber, a light stabilizer, an antistatic agent, an anti-fogging agent or a color pigment.

(Dehydrating Condensation Catalyst)

The alkoxysilyl groups form siloxane bonds by hydrolysis with water. Because the reaction rate is slow, however, an organometallic catalyst is usually used to accelerate the condensation reaction. The metal of the organometallic catalyst may be one or more selected from the group consisting of scandium, vanadium, copper, zinc, zirconium, palladium, gallium, tin, titanium, iron, nickel and lead, for example. The organometallic catalyst may be di-butyltin-di-laurate, di-butyltin-di-acetate or di-butyltin-di-octoate, in particular, which are known to overwhelmingly accelerate the reaction rate by the reaction mechanism proposed by Weij et al. (F. W. van. der. Weij: Macromol. Chem., 181, 2541, 1980.), but in recent years, in order to avoid damage to the environment and human health by organic tin, it is known that the Lewis functions of chelate complexes of copper or titanium can been utilized and combined with organic bases to promote reaction forming siloxane bonds between alkoxysilyl groups, similar to organic tin complexes.

(Master Batch Resin)

Dehydrating condensation catalysts are also known to function as catalysts for siloxane bond-forming reactions with alkoxysilyl group-containing resins. Throughout the present specification, the term "master batch resin" will be used to refer to a compounded product obtained by pre-adding a dehydrating condensation catalyst (or organometallic catalyst) to an alkoxysilyl group-containing resin or other kneaded resin in a continuous process with a step of kneading a resin using an extruder.

(Plasticizer)

The plasticizer is not particularly restricted, and examples include organic compounds that can form homogeneous solutions with polyolefins at temperatures below their boiling points. More specifically, these include decalin, xylene, dioctyl phthalate, dibutyl phthalate, stearyl alcohol, oleyl alcohol, decyl alcohol, nonyl alcohol, diphenyl ether, n-decane, n-dodecane and paraffin oil. Paraffin oil and dioctyl phthalate are preferred among these. A plasticizer may be used alone, or two or more may be used in combination.

The proportion of the plasticizer with respect to the total weight of the polyolefin is preferably 20 weight % or greater from the viewpoint of the porosity of the obtained microporous membrane, and preferably no greater than 90 weight % for the viewpoint of the viscosity during melt kneading.

[Sheet-Forming Step (Extrusion Step)]

The sheet-forming step is a step in which the obtained kneaded blend or a mixture of the silane graft-modified polyolefin, polyethylene and plasticizer is extruded, cooled to solidification, and cast into a sheet form to obtain a sheet. The sheet forming method is not particularly restricted, and may be a method of compressed-cooling solidification of a molten mixture obtained by melt kneading and extrusion. The cooling method may be (i) a method of direct contact with a cooling medium such as cooling water; or (ii) a method of contact with a refrigerant-cooled roll or a pressing machine, with method (ii) being preferred for superior membrane thickness control.

From the viewpoint of resin aggregates in the separator, and the maximum internal heat release rate, the weight ratio of the silane graft-modified polyolefin and polyethylene in the sheet-forming step (silane graft-modified polyolefin weight/polyethylene weight) is preferably 0.05/0.95 to 0.40/0.60 and more preferably 0.06/0.94 to 0.38/0.62.

[Stretching Step]

The stretching step is a step in which the plasticizer or inorganic material is extracted from the obtained sheet as necessary, and the sheet is further subjected to stretching in one or more axial directions. The method of stretching the sheet may be MD uniaxial stretching with a roll stretcher, TD uniaxial stretching with a tenter, sequential biaxial stretching with a combination of a roll stretcher and tenter, or a tenter and tenter, or simultaneous biaxial stretching with a biaxial tenter and inflation molding. Simultaneous biaxial stretching is preferred from the viewpoint of obtaining a more homogeneous membrane.

The total area increase is preferably 8-fold or greater, more preferably 15-fold or greater and even more preferably 20-fold or greater or 30-fold or greater, from the viewpoint of membrane thickness homogeneity, and balance between tensile elongation, porosity and mean pore size. If the total area increase is 8-fold or greater, it will tend to be easier to obtain high strength and a satisfactory thickness distribution. The area increase is also no greater than 250-fold from the viewpoint of preventing rupture.

[Porous Body-Forming Step (Extraction Step)]

The porous body-forming step is a step in which the plasticizer is extracted from the stretched sheet after the stretching step to form pores in the stretched sheet.

The method of extracting the plasticizer is not particularly restricted, and may be a method of immersing the stretched sheet in an extraction solvent or a method of showering the stretched sheet with an extraction solvent, for example. The extraction solvent used is not particularly restricted, but it is preferably one that is a poor solvent for the polyolefin and a good solvent for the plasticizer and inorganic material, and that has a boiling point that is lower than the melting point of the polyolefin. Such extraction solvents are not particularly restricted and include hydrocarbons such as n-hexane and cyclohexane; halogenated hydrocarbons such as methylene chloride, 1,1,1-trichloroethane and fluorocarbon-based compounds; alcohols such as ethanol and isopropanol; ketones such as acetone and 2-butanone; and alkali water. An extraction solvent may be used alone, or two or more may be used in combination.

[Heat Treatment Step]

The heat treatment step is a step in which, after the stretching step, the plasticizer is also extracted from the sheet as necessary and heat treatment is further carried out to obtain a microporous membrane.

The method of heat treatment is not particularly restricted, and for example, it may be a heat setting method in which a tenter or roll stretcher is utilized for stretching and relaxation procedures. A relaxation procedure is a procedure of shrinking carried out at a prescribed temperature and relaxation factor, in the machine direction (MD) and/or transverse direction (TD) of the membrane. The relaxation factor is the value of the MD dimension of the membrane after the relaxation procedure divided by the MD dimension of the membrane before the procedure, or the value of the TD dimension after the relaxation procedure divided by the TD dimension of the membrane before the procedure, or the product of the relaxation factor in the MD and the relaxation factor in the TD, when both the MD and TD have been relaxed.

For this embodiment, stretching and relaxation in the TD of the porous body is preferred from the viewpoint of obtaining a heat-treated porous body suitable for the affinity treatment step and crosslinking step.

[Affinity Treatment Step]

The affinity treatment step is a step in which the microporous membrane obtained in the heat treatment step is immersed in an organic solvent that is amphiphilic for water and organic materials, and which is carried out in order to improve the wettability between the polyolefin and water. Since an amphiphilic organic solvent is disposed inside the affinity-treated porous body for this embodiment, it increases affinity with the liquid, and may also increase the affinity between the material or catalyst that promotes the crosslinking reaction during the crosslinking step.

The organic solvent used is not particularly restricted, and examples include alcohols, acetone, ethylene carbonate, N-methyl-2-pyrrolidone and dimethyl sulfoxide. The method of immersion may be a method of immersing the heat-treated porous body in an organic solvent or a method of showering the heat-treated porous body with an organic solvent.

[Crosslinking Step]

The crosslinking step is a step in which the alkoxysilyl groups in the microporous membrane obtained by the affinity treatment step are reacted to form siloxane bonds (crosslinking reaction).

For this embodiment, the affinity-treated porous body is contacted with a mixture of an organometallic catalyst and water or is immersed in a base solution or acid solution for silane dehydration condensation reaction, to form oligosiloxane bonds.

For common molded articles such as hot water pipes, a Sn-based catalyst is loaded into the extruder during the extrusion step, but in a production process for a separator for an electricity storage device, accelerated silane crosslinking in the extruder during the sheet-forming step can lead to poor production of the gelled sections, and difficult stretching of the silane-crosslinked polyolefin during the subsequent stretching step. For this embodiment, therefore, the silane crosslinking treatment is carried out after the stretching step, heat treatment step and affinity treatment step to ensure the heat resistance, shape retention and rupture resistance of the separator by the silane crosslinked sections.

The metal of the organometallic catalyst may be one or more selected from the group consisting of scandium, vanadium, copper, zinc, zirconium, palladium, gallium, tin, titanium, iron, nickel and lead, for example, among which tin, zinc or palladium is preferred, and tin or zinc is more preferred. Examples of organic tin complexes that can be used as catalysts include dibutyltin dilaurate, dibutyltin diacetate, dibutyltin dioctoate, stannous acetate and stannous caprylate.

The base solution may have a pH of higher than 7 and may include alkali metal hydroxides, alkaline earth metal hydroxides, alkali metal carbonates, alkali metal phosphates, ammonia or amine compounds, for example. Of these, alkali metal hydroxides and alkaline earth metal hydroxides are preferred, alkali metal hydroxides are more preferred and sodium hydroxide is even more preferred, from the viewpoint of the electricity storage device safety and the silane crosslinking property.

The acid solution is a pH of below 7 and may include inorganic acids or organic acids, for example. Preferred acids are hydrochloric acid, sulfuric acid, carboxylic acids or phosphoric acids.

From the viewpoint of inhibiting thermal runaway reaction during electricity storage device destruction, for improved safety, the crosslinking step is preferably carried out by immersing the affinity-treated porous body in a base solution or acid solution.

When the affinity-treated porous body is to be immersed in a base solution, the temperature of the base solution is preferably 20° C. to 100° C. and/or the base solution pH is preferably 8 to 14, from the viewpoint of further improving safety. The reagent to be used for pH adjustment is not particularly restricted and may be an alkali metal hydroxide or alkaline earth metal hydroxide. From the same viewpoint, the aqueous alkali solution preferably does not include amine compounds such as ethylamine, dibutylamine, hexylamine or pyridine.

Without being constrained by any particular theory, it is believed that when the affinity-treated porous body is immersed in an acid solution, the acid acts to catalytically promote formation of Si—O bonds in the silane-crosslinked polyolefin rather than breaking the Si—O bonds of the silane-crosslinked polyolefin.

When the affinity-treated porous body is contacted with a mixture of an organometallic catalyst and water, from the viewpoint of controlling the amorphous part of the microporous membrane to ensure safety, the content of scandium, vanadium, copper, zinc, zirconium, palladium, gallium, tin, titanium, iron, nickel or lead in the finally obtained microporous membrane is preferably adjusted to be in the range of 0.10 ppm to 200 ppm as the total in terms of atoms, and more preferably the content of zinc or tin in the microporous membrane is adjusted to be in the range of 0.10 ppm to 200 ppm as the total in terms of atoms. The content of scandium, vanadium, copper, zinc, zirconium, palladium, gallium, tin, titanium, iron, nickel or lead in the microporous membrane may be adjusted by the washing and drying step described below, for example. It has been found that when the metal contents are within this specified range, decomposition of the crosslinked structure of the porous membrane is inhibited and safety is ensured, and the battery cycle characteristic is also satisfactorily exhibited. It has been shown by the present inventors that when the metals are present in excess in a separator for an electricity storage device, eluting ions infiltrate into the positive electrode, altering the structures of the metal clusters that are storing Li, producing electrical defect points in the positive electrode as a whole, and impairing the cycle performance.

[Washing and Drying Step]

The washing and drying step is a step in which the microporous membrane obtained in the crosslinking step is washed with water and dried. The preferred conditions for the washing and drying step are a water temperature of 20 to 100° C. and/or a washing water pH of 6 to 8. For example, the microporous membrane interior may be replaced with water at a pH of 6 to 8 and a temperature of 20 to 100° C., and then dried. The drying method is not particularly restricted and may be transport with a heated roll, blasting of hot air, or heat drying using an infrared heater.

[Inorganic Porous Layer Coating Step]

The coating step (8A) for the inorganic porous layer is a step in which an inorganic porous layer comprising inorganic particles and a resin binder is formed on at least one surface of the microporous membrane obtained as described above. The coating step (8A) for the inorganic porous layer may be carried out after the silane crosslinking reaction of the silane graft-modified polyolefin.

Layer B described above can be formed by carrying out the coating step (8A). The method used to form layer B may be a known production method. The method of fabricating a laminated stack comprising layer A and layer B may be, for example, a method of coating an inorganic particle-containing slurry onto layer A, a method of layering and extruding the starting material for layer B and the starting material for layer A by a co-extrusion method, or a method of separately preparing layer A and layer B and then attaching them together.

The inorganic porous layer can be formed, for example, by coating at least one surface of the microporous membrane with a slurry containing inorganic particles, a resin binder, water or an aqueous solvent (for example, a mixture of water and an alcohol) and optionally a dispersing agent. The inorganic particles, resin binder and dispersing agent may be as described above for the first or second embodiment.

The solvent in the slurry is preferably one that can uniformly and stably disperse or dissolve the inorganic particles. Examples of such solvents include N-methylpyrrolidone (NMP), N,N-dimethylformamide, N,N-dimethylacetamide, water, ethanol, toluene, hot xylene, methylene chloride and hexane.

The method of preparing the inorganic particle-containing slurry may be, for example, a mechanical stirring method using a ball mill, bead mill, planetary ball mill, vibrating ball mill, sand mill, colloid mill, attritor, roll mill, high-speed impeller disperser, disperser, homogenizer, high-speed impact mill, ultrasonic disperser or stirring blade.

Examples for the method of coating the inorganic particle-containing slurry include gravure coater methods, small-diameter gravure coater methods, reverse roll coater methods, transfer roll coater methods, kiss coater methods, dip coater methods, knife coater methods, air doctor coater methods, blade coater methods, rod coater methods, squeeze coater methods, cast coater methods, die coater methods, screen printing methods and spray coating methods.

The method for removing the solvent from the coated membrane may be a method of drying at a temperature below the melting point of the material forming the microporous membrane, or a method of reduced pressure drying at low temperature. Some of the solvent may be allowed to remain so long as it does not produce any notable effect on the device properties.

[Winding/Slitting Step]

The winding step is a step in which the obtained microporous membrane or the inorganic porous layer-coated microporous membrane is slitted if necessary and wound onto a prescribed core.

The separator obtained by the method that includes each of the steps described above may be utilized in an electricity storage device, and particularly in a lithium battery or lithium ion secondary battery.

<Method for Producing Electricity Storage Device>

The method for producing an electricity storage device comprises the following steps:
  (a) a step of laminating and/or winding a positive electrode, a separator produced by the method of the third embodiment, and a negative electrode, to obtain a laminated stack or wound body;
  (b) a step of inserting the laminated stack or wound body into an exterior body;
  (c) a step of pouring an electrolyte solution into the exterior body; and
  (d) a step of connecting lead terminals to the positive electrode and negative electrode.

Steps (a) to (d) can be carried out by a method known in the technical field, except for using a separator for an electricity storage device produced by the method of the third embodiment, and a positive electrode, negative electrode, electrolyte solution and exterior body known in the technical field may be used in steps (a) to (d).

A separator with a longitudinal shape having a width of 10 to 500 mm (preferably 80 to 500 mm) and a length of 200 to 4000 m (preferably 1000 to 4000 m) may be produced for step (a). Next, in step (a), lamination may be carried out in the order: positive electrode-separator-negative electrode-separator or negative electrode-separator-positive electrode-separator, and the laminate wound into a circular or flat spiral form to obtain a wound body. In steps (b) and (c), the wound body may be housed in a device can (for example, a battery can) and a nonaqueous electrolyte solution injected to produce an electricity storage device. The electrodes and the wound body obtained by folding the separator may then be placed in a device container (for example, an aluminum film), which is then filled with a nonaqueous electrolyte solution, thereby producing an electricity storage device.

The wound body may also be pressed during this time. Specifically, the separator may be stacked and pressed with an electrode having a current collector and an active material layer formed on at least one side of the current collector.

The pressing temperature is preferably 20° C. or higher, as an example of a temperature allowing adhesion to be effectively exhibited. From the viewpoint of inhibiting blocking or heat shrinkage of the pores in the separator by hot pressing, the pressing temperature is preferably lower than the melting point of the material in the microporous membrane, and more preferably no higher than 120° C. The pressing pressure is preferably no higher than 20 MPa from the viewpoint of inhibiting blocking of the pores of the separator. The pressing time may be up to 1 second when a roll press is used, or several hours for surface pressing, but from the viewpoint of productivity it is preferably no longer than 2 hours.

By this production process it is possible to reduce press back during press molding of a wound body comprising the electrodes and the separator. It is thus possible to inhibit yield reduction in the device assembly steps and shorten the production process time.

The electrolyte solution to be used in step (c) may include a fluorine (F)-containing lithium salt such as $LiPF_6$, $LiBF_4$, $LiN(SO_2CF_3)_2$ or $LiSO_3CF_3$, or an electrolyte such as $LiBC_4O_8$ (LiBOB), but it preferably includes a $LiPF_6$-containing electrolyte or F-containing electrolyte and a nonaqueous solvent.

EXAMPLES

The present invention will now be explained in greater detail by examples and comparative examples, with the understanding that the invention is not limited to the examples so long as its gist is maintained. The physical properties in the examples were measured by the following methods.

<Weight-Average Molecular Weight (Mw)>

Standard polystyrene was measured using a Model ALC/GPC 150C™ by Waters Co. under the following conditions, and a calibration curve was drawn. The chromatogram for each polymer was also measured under the same conditions, and the weight-average molecular weight of each polymer was calculated by the following method, based on the calibration curve.

Column: $GMH_6$-HT™ (2)+$GMH_6$-HTL™ (2), by Tosoh Corp.
  Mobile phase: o-Dichlorobenzene
  Detector: differential refractometer Flow rate: 1.0 ml/min
Column temperature: 140° C.
Sample concentration: 0.1 wt %
(Weight-Average Molecular Weight of Polyethylene)

Each molecular weight component in the obtained calibration curve was multiplied by 0.43 (polyethylene Q factor/polystyrene Q factor=17.7/41.3), to obtain a molecular weight distribution curve in terms of polyethylene, and the weight-average molecular weight was calculated.
(Weight-Average Molecular Weight of Resin Composition)

The weight-average molecular weight was calculated in the same manner as for polyethylene, except that the Q factor value for the polyolefin with the largest weight fraction was used.

<Viscosity-Average Molecular Weight (Mv)>

The limiting viscosity [η] (dl/g) at 135° C. in a decalin solvent was determined based on ASTM-D4020. The My of polyethylene was calculated by the following formula.

$$[\eta]=6.77\times10^{-4}Mv^{0.67}$$

<Melt Mass-Flow Rate (MFR) (g/10 Min)>

A melt mass-flow rate measuring device by Toyo Seiki Co., Ltd. (Melt Indexer F-F01) was used to determine the weight of the resin extruded for 10 minutes under conditions of 190° C., 2.16 kg pressure, as the MFR value.

<Measurement of Glass Transition Temperature>

An appropriate amount of the resin sample-containing aqueous dispersion (solid content=38 to 42 wt %, pH=9.0) was placed in an aluminum pan and dried for 30 minutes with a hot air drier at 130° C. to obtain a dry membrane. Approximately 17 mg of the dried membrane was packed into an measuring aluminum container, and DSC and DDSC curves were obtained using a DSC measuring apparatus (model DSC6220 by Shimadzu Corp.) under a nitrogen atmosphere. The measuring conditions were as follows.

Stage 1 heating program: Start=70° C., temperature increase at 15° C./min. Temperature maintained for 5 minutes after reaching 110° C.

Stage 2 cooling program: Temperature decrease from 110° C. at 40° C./min. Temperature maintained for 5 minutes after reaching −50° C.

Stage 3 heating program: Temperature decrease from −50° C. to 130° C. at 15° C./min. Recording of DSC and DDSC data during stage 3 temperature increase.

The intersection between the baseline (an extended straight line toward the high-temperature end from the baseline of the obtained DSC curve) and the tangent line at the inflection point (the point where the upwardly convex curve changed to a downwardly convex curve) was recorded as the glass transition temperature (Tg).

<Membrane Thickness (μm)>

A KBM™ microthickness meter by Toyo Seiki Co., Ltd. was used to measure the membrane thickness of the microporous membrane or separator at room temperature (23±2° C.) and 60% relative humidity. Specifically, the membrane thickness was measured at 5 points at approximately equal intervals across the entire width in the TD direction, and the average value was calculated. The thickness of the inorganic porous layer can be calculated by subtracting the thickness of the microporous membrane from the thickness of the separator comprising the microporous membrane and the inorganic porous layer.

<Layer a Thickness (TA), Layer B Thickness (TB)>

A KBM™ microthickness meter by Toyo Seiki Co., Ltd. was used to measure the thickness (TA) of layer A at room temperature (23±2° C.) and 60% relative humidity. Specifically, the membrane thickness was measured at 5 points at approximately equal intervals across the entire width in the TD, and the average value was calculated. The thickness of the laminated stack including layer A and layer B was obtained by the same method. The thickness (TA) of layer A was subtracted from the thickness of the obtained laminated stack to obtain the thickness (TB) of the layer B.

The thickness of the obtained laminated stack was treated as the total thickness (TA+TB) of layer A and layer B. The thickness (TA) was divided by the thickness (TB) to obtain the thickness ratio (TA/TB).

<Porosity (%)>

(i) Calculation from Density of Mixed Composition

A 10 cm×10 cm-square sample was cut out from the microporous membrane, and its volume (cm$^3$) and mass (g) were determined and used together with the density (g/cm$^3$) by the following formula, to obtain the porosity. The density value used for the mixed composition was the value determined by calculation from the densities of the starting materials used and their mixing ratio.

Porosity (%)=(Volume−(mass/density of mixed composition))/volume×100

(ii) Calculation from Membrane Density

Alternatively, the porosity of the microporous membrane may be calculated by the following formula from the volume, mass and membrane density (g/cm$^3$).

Porosity (%)=(Volume−(mass/membrane density))/volume×100

The membrane density, for the purpose of the present disclosure, is the value measured according to the density gradient tube method D described in JIS K7112(1999).

(iii) Porosity of Layer A

A 10 cm×10 cm-square sample was cut out from layer A, and its volume (cm$^3$) and mass (g) were determined and used together with the density (g/cm$^3$) in the following formula, to obtain the porosity. The density value used for the mixed composition was the value determined by calculation from the densities of the starting materials used and their mixing ratio.

Porosity (%)=(Volume−(mass/density of mixed composition))/volume×100

<Air Permeability (Sec/100 cm$^3$)>

The air permeability of the sample or layer A was measured with a Gurley air permeability tester (G-B2™ by Toyo Seiki Kogyo Co., Ltd.), according to JIS P-8117(2009).

<Puncture Strength of Layer A>

Using a Handy Compression Tester KES-G5 (model name) by Kato Tech Corp., layer A was anchored with a specimen holder having an opening diameter of 11.3 mm. Next, the center section of the anchored layer A was subjected to a puncture test with a needle having a tip curvature radius of 0.5 mm, at a puncture speed of 2 mm/sec and a 25° C. atmosphere, to measure the maximum puncture load. The value of the maximum puncture load per 20 μm thickness was recorded as the puncture strength (gf/20 μm). When the thermoplastic polymer is only present on one side of the base material, the needle may be used for piercing from the side where the thermoplastic polymer is present.

<Quantification of Resin Aggregates in Separator>

The resin aggregates in the separator were defined in a region with an area of 100 μm length × 100 μm width, and with no light permeation, when separators obtained by the membrane formation steps in the Examples and Comparative Examples described below were observed with a transmission optical microscope. The number of resin aggregates per 1000 m² area of the separator were counted during observation with a transmission optical microscope.

<TMA Membrane Rupture Temperature>

Using a TMA50™ by Shimadzu Corp. in fixed-length mode, the environmental temperature is varied from 25 to 250° C. and the temperature at the moment that the load is fully released is established as the TMA membrane rupture temperature.

Specifically, for measurement in the MD direction, the microporous membrane was sampled at 3 mm in the TD direction and 14 mm in the MD direction and both ends of the sample in the MD direction were anchored with a chuck to a dedicated probe, an initial load of 1.0 g was applied with the chuck distance at 10 mm, and the temperature of a furnace in which the test piece had been mounted was increased, recording the TMA membrane rupture temperature as the temperature at which the load was shown to be 0 g.

For measurement in the TD direction, the microporous membrane is sampled at 14 mm in the TD direction and 3 mm in the MD direction and both ends in the TD of the sample are anchored with a chuck to a dedicated probe, the chuck distance is set to 10 mm, an initial load of 1.0 g is applied, and the same procedure as above is carried out.

<Membrane Rupture Temperature of Layer A>

Using a TMA50™ by Shimadzu Corp. in fixed-length mode, the environmental temperature was varied from 25 to 250° C. and the temperature at the moment that the load was fully released was established as the TMA membrane rupture temperature (the membrane rupture temperature of layer A, measured by TMA).

Specifically, a sample was taken from layer A at 3 mm in the TD and 14 mm in the MD, for use as a sample strip (a sample strip with the long side in the MD). Both ends of the sample strip in the MD were set on a dedicated probe with the chuck distance at 10 mm, and a load of 1.0 g was applied to the sample strip. The furnace in which the test piece had been mounted was increased in temperature, and the membrane rupture temperature (° C.) was recorded as the temperature at which the load was shown to be 0 g.

When measuring a sample strip TD with the long side in the TD, layer A is sampled to 14 mm in the TD and 3 mm in the MD and used as the sample strip, both ends in the TD of the sample are anchored with a chuck to a dedicated probe, the chuck distance is set to 10 mm, an initial load of 1.0 g is applied, and the same procedure as above is carried out.

<Heat Shrinkage Factor at 150° C.>

The laminated stack before formation of the crosslinked structure (the laminated stack comprising layer A and layer B) was sampled at 100 mm in the TD and 100 mm in the MD, for use as a sample strip. The sample strip was allowed to stand for 1 hour in an oven at 150° C. During this time, the sample strip was sandwiched between two sheets so that the warm air did not directly contact with the sample strip. After removing the sample strip from the oven and cooling it, the area of the sample strip was measured, and the heat shrinkage factor at 150° C. (T1) before formation of the crosslinked structure was calculated by the following formula.

Heat shrinkage factor at 150° C. (%)=(10,000($Mm^2$)-area of sample strip after heating($Mm^2$))×100/10,000

The laminated stack after formation of the crosslinked structure was also sampled to 100 mm in the TD and 100 mm in the MD to obtain a sample strip, and the same procedure as above was carried out, to calculate the heat shrinkage factor at 150° C. (T2) after formation of the crosslinked structure.

The heat shrinkage factor (T2) was divided by the heat shrinkage factor (T1) to obtain the ratio (T2/T1). The value of the ratio (T2/T1) corresponds to the change in the heat shrinkage factor at 150° C. (T2) after formation of the crosslinked structure with respect to the heat shrinkage factor at 150° C. (T1) before formation of the crosslinked structure.

<Battery Destruction Safety Test 1>

Battery destruction safety test 1 is a test in which a battery charged to 4.5 V is hit with an iron nail at a speed of 20 mm/sec, puncturing it to produce internal short circuiting. This test can measure time-dependent change behavior of voltage reduction of the battery due to internal short circuiting, and battery surface temperature increase behavior due to internal short circuiting, to elucidate these phenomena during internal short circuiting. Inadequate shutdown function of the separator during internal short circuiting or membrane rupture at low temperature can also result in sharp heat release of the battery, which may lead to ignition of the electrolyte solution and fuming and/or explosion of the battery.

(Fabrication of Battery to be Used in Battery Destruction Safety Test 1)

1a. Fabrication of Positive Electrode

A slurry was prepared by sampling 92.2 weight % of lithium cobalt composite oxide ($LiCoO_2$) as a positive electrode active material, 2.3 weight % each of flaky graphite and acetylene black as conductive materials and 3.2 weight % of polyvinylidene fluoride (PVDF) as a resin binder, and dispersing them in N-methylpyrrolidone (NMP). The slurry was coated using a die coater onto one side of a 20 μm-thick aluminum foil as the positive electrode collector, and dried at 130° C. for 3 minutes, after which it was compression molded using a roll press. During this time, the active material coating amount on the positive electrode was adjusted to 250 g/m² and the active material bulk density was adjusted to 3.00 g/cm³.

1b. Fabrication of Negative Electrode

A slurry was prepared by dispersing 96.9 weight % of artificial graphite as a negative electrode active material, 1.4 weight % of carboxymethyl cellulose ammonium salt as a resin binder and 1.7 weight % of styrene-butadiene copolymer latex in purified water. The slurry was coated using a die coater onto one side of a 12 μm-thick copper foil as the negative electrode collector, and dried at 120° C. for 3 minutes, after which it was compression molded using a roll press. During this time, the active material coating amount on the negative electrode was adjusted to 106 g/m² and the active material bulk density was adjusted to 1.35 g/cm³.

1c. Preparation of Nonaqueous Electrolyte Solution

A 1.0 mol/L portion of concentrated $LiPF_6$, as a solute, was dissolved in a mixed solvent of ethylene carbonate:ethylmethyl carbonate=1:2 (volume ratio), to prepare a nonaqueous electrolyte solution.

1d. Battery Assembly

A separator was cut out to 60 mm in the widthwise (TD) direction and 1000 mm in the lengthwise (MD) direction, the separator was folded in a hairpin fashion, and positive electrodes and negative electrodes were alternately stacked between the separator (12 positive electrodes, 13 negative electrodes). The positive electrodes used had areas of 30 mm×50 mm, and the negative electrodes had areas of 32 mm×52 mm. The laminated stack that had been folded in a hairpin fashion was inserted into a laminating bag, and then injected with the nonaqueous electrolyte solution obtained in c. above and sealed. After allowing it to stand at room temperature for 1 day, it was subjected to initial charge of the fabricated battery for a total of 6 hours, by a method of charging to a cell voltage of 4.2 V at a current value of 3 mA (0.5 C) in an atmosphere of 25° C. and, after reaching that voltage, beginning to draw out a current of 3 mA while maintaining 4.2 V. The battery was then discharged to a cell voltage of 3.0 V at a current value of 3 mA (0.5 C).

(Maximum Heat Release Rate)

After puncturing the obtained battery with an iron nail, the battery surface temperature was measured using a thermocouple for a period of 300 seconds and the resulting temperature change graph was used to determine the rate during which the change in temperature increase per second was greatest, as the maximum heat release rate.

(Voltage Reduction Time)

The time required for voltage reduction from 4.5 V to 3 V after puncturing the obtained battery with an iron nail was established as the voltage reduction time (3 V reduction time).

<Cycle Characteristic Evaluation and Battery Fabrication Method>

A battery for evaluation of cycle characteristics was fabricated by the same method as in 1a. to 1c. above for the method of fabricating a battery used in <Battery destruction safety test 1>, but with the assembly described in 1d-2. below.

1d-2. Battery Assembly

The separator was cut out to a circle with a diameter of 18 mm and the positive electrode and negative electrode to circles with diameters of 16 mm, and the positive electrode, separator and negative electrode were stacked in that order with the active material sides of the positive electrode and negative electrode facing each other, after which they were housed in a covered stainless steel container. The container and cover were insulated, with the container in contact with the negative electrode copper foil and the cover in contact with the positive electrode aluminum foil. The nonaqueous electrolyte solution obtained in 1c. under <Battery destruction safety test 1> above was injected into the container, which was then sealed. After allowing it to stand at room temperature for 1 day, it was subjected to initial charge of the fabricated battery for a total of 6 hours, by a method of charging to a cell voltage of 4.2 V at a current value of 3 mA (0.5 C) in an atmosphere of 25° C. and, after reaching that voltage, beginning to draw out a current of 3 mA while maintaining 4.2 V. The battery was then discharged to a cell voltage of 3.0 V at a current value of 3 mA (0.5 C).

Charge-discharge of the obtained battery was carried out for 100 cycles in an atmosphere of 60° C. Charging was for a total of 3 hours, by a method of charging to a cell voltage of 4.2 V at a current value of 6.0 mA (1.0 C) and, after reaching that voltage, beginning to draw out a current of 6.0 mA while maintaining 4.2 V. Discharge was to a cell voltage of 3.0 V at a current value of 6.0 mA (1.0 C).

(Cycle Characteristic Evaluation 1)

The capacity retention was calculated from the service capacity at the 100th cycle and the service capacity at the first cycle. A high capacity retention was evaluated as a satisfactory cycle characteristic.

(Cycle Characteristic Evaluation 2)

The capacity retention (%) was calculated from the service capacity at the 300th cycle and the service capacity at the first cycle, based on the following formula. A high capacity retention was evaluated as a satisfactory cycle characteristic.

Evaluation result (%)=(Retention volume after 100×300cycle/service capacity at first cycle)

<Fuse/Meltdown (F/MD) Characteristic>

(i) Pressure of 0.5 MPa and Temperature-Elevating Rate of 2° C./Min

A circular positive electrode, separator and negative electrode with diameters of 200 mm were cut out and stacked, and a nonaqueous electrolyte solution was added to the obtained laminated stack and allowed to thoroughly permeate it. The laminated stack is inserted between the center section of circular aluminum heater with a diameter of 600 mm, and the aluminum heater is pressed vertically with a hydraulic jack to 0.5 MPa, thus completing preparation for the measurement. The laminated stack is heated with the aluminum heater at a temperature-elevating rate of 2° C./min while measuring the resistance (Ω) between the electrodes. Resistance between the electrodes increases with fusing of the separator, and the temperature when the resistance first exceeds 1000Ω is recorded as the shutdown temperature. Heating is continued, and the temperature when the resistance falls below 1000Ω is recorded as the meltdown temperature (membrane rupture temperature).

(ii) Maximum Pressurization of 10 MPa and Temperature-Elevating Rate of 15° C./Min A circular positive electrode, separator and negative electrode with diameters of 200 mm were cut out and stacked, and a nonaqueous electrolyte solution was added to the obtained laminated stack and allowed to thoroughly permeate it. The laminated stack was inserted between the center section of circular aluminum heater with a diameter of 600 mm, and the aluminum heater was pressed vertically with a hydraulic jack to a pressure of 10 MPa, thus completing preparation for the measurement. The laminated stack was heated with the aluminum heater at a temperature-elevating rate of 15° C./min while measuring the resistance (Ω) between the electrodes. Resistance between the electrodes increased, and the temperature when the resistance first exceeded 1000Ω was recorded as the shutdown temperature (° C.). Heating was further continued, and the temperature when the resistance fell below 1000Ω was recorded as the meltdown temperature (° C.).

For the evaluations of both (i) and (ii), a resistance measurement wire was bonded with conductive silver paste behind the aluminum foil of the positive electrode fabricated according to "1a. Fabrication of positive electrode" under <Battery destruction safety test 1> above. In addition, a resistance measurement wire was bonded with conductive silver paste behind the negative electrode copper foil fabricated according to "1b. Fabrication of negative electrode" under <Battery destruction safety test 1> above. An electrolyte-containing solution prepared according to "1c. Preparation of nonaqueous electrolyte solution" under <Battery destruction safety test 1> above was also used for the F/MD property test.

<Safety Test (Nail Penetration Test) 2>

2a. Fabrication of Positive Electrode

After mixing 90.4 weight % of a nickel, manganese and cobalt composite oxide (NMC) (Ni:Mn:Co=1:1:1 (element ratio), density: 4.70 g/cm$^3$), as the positive electrode active material, 1.6 weight % of graphite powder (KS6) (density: 2.26 g/cm$^3$, number-mean particle size: 6.5 μm) and 3.8 weight % of acetylene black powder (AB) (density: 1.95 g/cm$^3$, number-mean particle size: 48 nm), as conductive aids, and 4.2 weight % of PVDF (density: 1.75 g/cm$^3$) as a resin binder, the mixture was dispersed in NMP to prepare a slurry. The slurry was coated using a die coater onto one side of a 20 μm-thick aluminum foil sheet as the positive electrode collector, and dried at 130° C. for 3 minutes, after which it was compression molded using a roll press, to fabricate a positive electrode. The coating amount of the positive electrode active material was 109 g/m$^2$.

2b. Fabrication of Negative Electrode

In purified water there were dispersed 87.6 weight % of graphite powder A (density: 2.23 g/cm$^3$, number-mean particle size: 12.7 μm) and 9.7 weight % of graphite powder B (density: 2.27 g/cm$^3$, number-mean particle size: 6.5 μm) as negative electrode active materials, and 1.4 (solid) weight % of carboxymethyl cellulose ammonium salt (1.83 weight % solid concentration aqueous solution) and 1.7 (solid) weight % of diene rubber latex (40 weight % solid concentration aqueous solution) as resin binders, to prepare a slurry. The slurry was coated using a die coater onto one side of a 12 μm-thick copper foil sheet as the negative electrode collector, and dried at 120° C. for 3 minutes, after which it was compression molded using a roll press to fabricate a negative electrode. The coating amount of the negative electrode active material was 52 g/m$^2$.

2c. Preparation of Nonaqueous Electrolyte Solution

A 1.0 mol/L portion of concentrated LiPF$_6$, as a solute, was dissolved in a mixed solvent of ethylene carbonate:ethyl methyl carbonate=1:2 (volume ratio), to prepare a nonaqueous electrolyte solution.

2d. Fabrication of Battery

The positive electrode, negative electrode and nonaqueous electrolyte solution obtained in 2a to 2c above, and a separator (a separator of the Examples or a separator of the Comparative Examples) were used to fabricate a laminated secondary battery with a size of 100 mm×60 mm and a capacity of 3 Ah, which was charged with constant current, constant voltage (CCCV) over a period of 3 hours under conditions with a current value of 1A (0.3 C) and a final cell voltage of 4.2 V.

2e. Nail Penetration Evaluation

The fabricated laminated secondary battery was set on a steel sheet in a temperature-adjustable explosion-proof booth. Setting the explosion-proof booth interior to a temperature of 40° C., the center section of the laminated secondary battery was punctured with an iron nail having a diameter of 3.0 mm at a speed of 2 mm/sec, and the nail was left in the punctured state. A thermocouple had been set inside the nail so as to allow measurement inside the laminated battery after puncturing with the nail, and its temperature was measured and the presence or absence of ignition was evaluated.

The evaluation was repeated using laminated secondary batteries newly fabricated by the same method, and the number of samples without ignition (no ignition) was calculated as a percentage value by the following formula.

Evaluation result (%)=(100×number of samples without ignition/total number of samples)

<Extrusion Stability>

The state of the polyolefin composition extruded during the extrusion step was observed and evaluated on the following scale.

A (Good): Change in current value of extruder within ±0.5 A of mean value for 300 seconds.

B (Poor): Change in current value of extruder exceeded ±0.5 A of mean value for 300 seconds.

<Metal Content>

The mass ratios of Sn atoms, Zn atoms, Tl atoms, Cu atoms, Fe atoms and Ni atoms in the sample were measured using an inductively coupled plasma (ICP) emission analyzer.

<Experiment Group I>

[Silane Graft-Modified Polyolefin Production Method]

The polyolefin starting material to be used as the silane graft-modified polyolefin may be one with a viscosity-average molecular weight (Mv) of 100,000 to 1,000,000, a weight-average molecular weight (Mw) of 30,000 to 920,000, and a number-average molecular weight of 10,000 to 150,000, and it may be propylene or a butene-copolymerized α-olefin. After melt kneading the polyethylene starting material with an extruder while adding an organic peroxide (di-t-butyl peroxide) and generating radicals in the polymer chain of the α-olefin, it was filled with trimethoxyalkoxide-substituted vinylsilane and addition reaction was carried out to introduce alkoxysilyl groups into the α-olefin polymer, forming a silane-graft structure. A suitable amount of an antioxidant (pentaerythritoltetrakis[3-(3,5-di-t-butyl-4-hydroxyphenyl)propionate]) was simultaneously added to adjust the radical concentration in the system, thus inhibiting chain-style chain reaction (gelation) in the α-olefin. The obtained silane-grafted polyolefin molten resin was cooled in water and pelletized, after which it was heat-dried at 80° C. for 2 days and the water and unreacted trimethoxyalkoxide-substituted vinylsilane were removed. The residual concentration of the unreacted trimethoxyalkoxide-substituted vinylsilane in the pellets was about 10 to 1500 ppm.

Tables 1 to 3 show silane graft-modified polyethylenes obtained by this method, as "Silane-modified polyethylene (B)".

[Membrane Formation Example I]

(Sheet-Forming Step)

To 79.2 weight % of polyethylene homopolymer with a weight-average molecular weight of 2,000,000 (polyethylene(A)) there was added 19.8 weight % of silane-grafted polyethylene (silane-modified polyethylene (B)) with an MFR of 0.4 g/min, obtained using a polyolefin with a viscosity-average molecular weight of 20,000 as starting material and modification reaction with trimethoxyalkoxide-substituted vinylsilane (the respective contents of resin compositions (A) and (B) thus being 0.8 and 0.2), and 1 weight % of pentaerythrityl-tetrakis-[3-(3,5-di-t-butyl-4-hydroxyphenyl)propionate] as an antioxidant, and these were dry blended using a tumbler blender to obtain a mixture. The obtained mixture was supplied to a twin-screw extruder through a feeder, under a nitrogen atmosphere. Liquid paraffin (kinematic viscosity at 37.78° C.: 7.59×10$^{-5}$ m$^2$/s) was also injected into the extruder cylinder by a plunger pump.

The mixture was melt kneaded with liquid paraffin in an extruder, and adjusted with a feeder and pump so that the quantity ratio of liquid paraffin in the extruded polyolefin composition was 70 weight % (i.e. a polymer concentration of 30 weight %). The melt kneading conditions were a preset temperature of 230° C., a screw rotational speed of 240 rpm and a discharge throughput of 18 kg/h.

The melt kneaded mixture was then extrusion cast through a T-die onto a cooling roll controlled to a surface temperature of 25° C., to obtain a gel sheet (molded sheet) with a raw membrane thickness of 1400 μm.

(Stretching step)

The gel sheet was then simultaneously fed into a biaxial tenter stretching machine for biaxial stretching, to obtain a stretched sheet. The stretching conditions were an MD factor of 7.0, a TD factor of 6.0 (i.e. a factor of 7×6), and a biaxial stretching temperature of 125° C.

(Porous body-forming step)

The stretched gel sheet was subsequently fed into a methyl ethyl ketone tank and thoroughly immersed in the methyl ethyl ketone for extraction removal of the liquid paraffin, after which the methyl ethyl ketone was dried off to obtain a porous body.

(Heat treatment step)

The porous body to be subjected to heat setting (HS) was fed to a TD tenter and HS was carried out at a heat setting temperature of 125° C. and a stretch ratio of 1.8, after which relaxation was carried out to a factor of 0.5 in the TD direction (i.e. the HS relaxation factor was 0.5).

(Affinity Treatment Step)

The heat-treated porous body was also fed to an ethanol bath (affinity treatment tank) and immersed and retained for 60 seconds for affinity treatment of the heat-treated porous body, to obtain an affinity-treated porous body.

(Crosslinking step)

The affinity-treated porous body was further fed to a 25% aqueous caustic soda solution (crosslinking treatment tank) and immersed and retained for 60 seconds for crosslinking treatment of the affinity-treated porous body to obtain a crosslinked porous body.

(Washing and drying step)

The crosslinked porous body was fed into water (washing treatment tank) and immersed and retained for 60 seconds for washing of the crosslinked porous body. It was then fed to a conveyor dryer and dried at 120° C. for 60 seconds to obtain a microporous membrane.

The obtained microporous membrane was then cut at the edges and wound up as a mother roll with a width of 1,100 mm and a length of 5,000 m.

Examples I-1 to I-11 and Comparative Examples I-1 to I-4

The microporous membranes listed in Tables 1 to 3 were obtained by the same procedure as Membrane Formation Example I, except for changing the quantity ratio of components A and B and the crosslinking method and conditions as shown in Tables 1 to 3. The obtained microporous membranes were subjected to each evaluation by the evaluation methods described above, and the evaluation results are shown in Tables 1 to 3.

Figure 2:
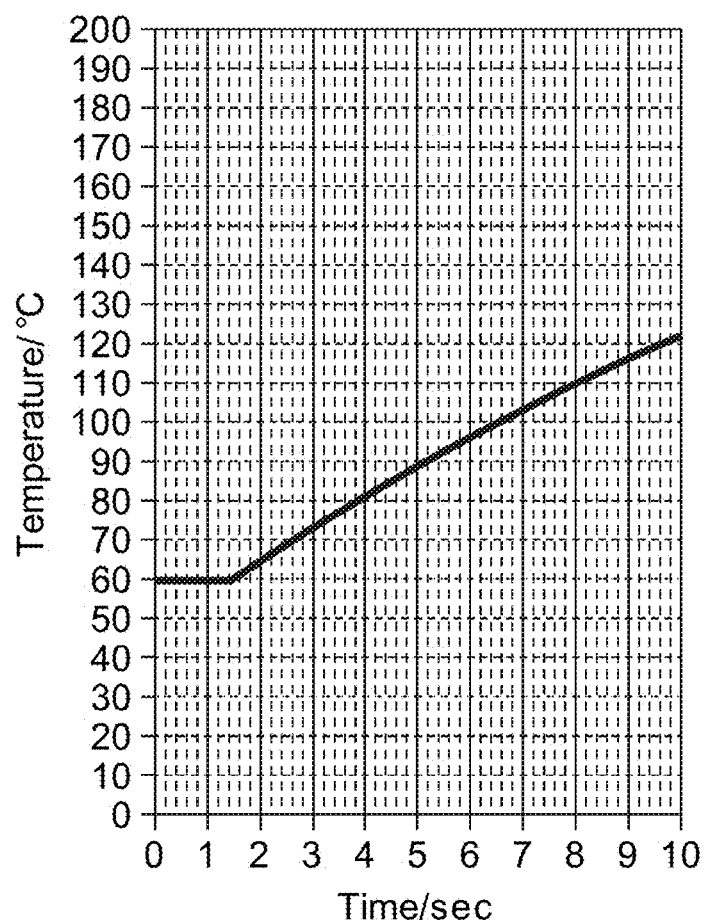
FIG. 2 is a heat release graph for a nail penetration safety test for a battery using the separator obtained in Example I-1.
Figure 3:
FIG. 3 is a voltage reduction graph for a nail penetration safety test for a battery using the separator obtained in Example I-1.

A TMA graph (FIG. 1), a heat release graph (FIG. 2) and voltage reduction graph (FIG. 3) during a battery nail penetration safety test were prepared for the separator obtained in Example I-1.

TABLE 1

| | | | Example I | | | | | |
|---|---|---|---|---|---|---|---|---|
| | | | 1 | 2 | 3 | 4 | 5 | 6 |
| Resin composition | Polyethylene (A) | | 0.8 | 0.62 | 0.94 | 0.8 | 0.97 | 0.58 |
| | Silane-modified polyethylene (B) | | 0.2 | 0.38 | 0.06 | 0.2 | 0.03 | 0.42 |
| Kneading temperature | | ° C. | 220 | 220 | 220 | 220 | 220 | 220 |
| Crosslinking method | Method | | Alkali treatment | Alkali treatment | Alkali treatment | Acid treatment | Alkali treatment | Alkali treatment |
| | Crosslinking reaction timing | | Crosslinking step | Crosslinking step | Crosslinking step | Crosslinking step | Crosslinking step | Crosslinking step |
| | Reagent | | Aqueous NaOH solution | Aqueous NaOH solution | Aqueous NaOH solution | Aqueous NaOH solution | Aqueous NaOH solution | Aqueous NaOH solution |
| | Temperature | ° C. | 80 | 80 | 80 | 60 | 80 | 80 |
| | Crosslinking treatment tank pH | | 14 | 14 | 14 | 1 | 14 | 14 |
| | Washing treatment tank pH | | 7-12 | 7-12 | 7-12 | 3-7 | 7-12 | 7-12 |
| Basic separator properties | Membrane thickness | μm | 8 | 8 | 8 | 8 | 8 | 8 |
| | Porosity | % | 35.4 | 35.3 | 35.7 | 36 | 35.3 | 35.3 |
| | Air permeability | sec/100 cm$^3$ | 150 | 143 | 155 | 152 | 143 | 143 |
| | Metal content ICP | [Sn] | ppm | 0.1 | 0.1 | 0.1 | 0.1 | 0.1 | 0.1 |
| | | [Zn] | ppm | 0.1 | 0.1 | 0.1 | 0.1 | 0.1 | 0.1 |
| | | [Ti] | ppm | 0.5 | 0.5 | 0.5 | 0.5 | 0.5 | 0.5 |
| | | [Cu] | ppm | 0.1 | 0.1 | 0.1 | 0.1 | 0.1 | 0.1 |
| Resin aggregates in separator | | /1000 m$^2$ | 6 | 12 | 3 | 5 | 12 | 283 |
| TMA membrane rupture temperature | | ° C. | 207 | 207 | 207 | 210 | 160 | nd |
| Battery cycle stability 1 | | % | 96 | 95 | 95 | 92 | 93 | 83 |
| Battery destruction safety 1 | Internal maximum heat release rate | ° C./sec | 10 | 11 | 10 | 12 | 25 | 11 |
| | Voltage reduction (3 V reduction time) | sec | none | none | none | none | 3 | none |
| Extrusion stability | | | A | A | A | A | A | A |

TABLE 2

| | | | Example I | | | | |
|---|---|---|---|---|---|---|---|
| | | | 7 | 8 | 9 | 10 | 11 |
| Resin composition | Polyethylene (A) | | 0.8 | 0.8 | 0.8 | 0.8 | 0.8 |
| | Silane-modified polyethylene (B) | | 0.2 | 0.2 | 0.2 | 0.2 | 0.2 |
| Kneading temperature | | °C | 220 | 220 | 220 | 220 | 220 |
| Crosslinking method | Method | | Alkali treatment | Alkali treatment | Alkali treatment | Alkali treatment | Alkali treatment |
| | Crosslinking reaction timing | | Crosslinking step | Crosslinking step | Crosslinking step | Crosslinking step | Crosslinking step |
| | Reagent | | Aqueous NaOH solution | Aqueous NaOH solution | Aqueous NaOH solution | Aqueous NaOH solution | Aqueous NaOH solution |
| | Temperature | °C. | 80 | 15 | 50 | 110 | 80 |
| | Crosslinking treatment tank pH | | 14 | 14 | 14 | 14 | 14 |
| | Washing treatment tank pH | | 7-12 | 7-12 | 7-12 | 7-12 | 7-12 |
| Basic separator properties | Membrane thickness | μm | 25 | 8 | 8 | 8 | 8 |
| | Porosity | % | 35 | 35.2 | 35.3 | 35.8 | 37 |
| | Air permeability | sec/100 cm³ | 90 | 144 | 145 | 148 | 151 |
| | Metal content ICP | [Sn] | ppm | 0.1 | 0.1 | 0.1 | 0.1 | 0.02 |
| | | [Zn] | ppm | 0.1 | 0.1 | 0.1 | 0.1 | 0.01 |
| | | [Ti] | ppm | 0.5 | 0.5 | 0.5 | 0.5 | 0.01 |
| | | [Cu] | ppm | 0.1 | 0.1 | 0.1 | 0.1 | 0.05 |
| Resin aggregates in separator | | /1000 m² | 7 | 5 | 5 | 7 | 6 |
| TMA membrane rupture temperature | | °C. | 207 | 155 | 178 | 230 | 182 |
| Battery cycle stability 1 | | % | 80 | 80 | 83 | 88 | 78 |
| Battery destruction safety 1 | Internal maximum heat release rate | °C./sec | 7 | 25 | 30 | 35 | 10 |
| | Voltage reduction (3 V reduction time) | sec | none | 6 | 5 | 5 | none |
| Extrusion stability | | | A | A | A | A | A |

TABLE 3

| | | | Comparative Example I | | | |
|---|---|---|---|---|---|---|
| | | | 1 | 2 | 3 | 4 |
| Resin composition | Polyethylene (A) | | 0 | 0.8 | 0.8 | 0.8 |
| | Silane-modified polyethylene (B) | | 1.0 | 0.2 | 0.2 | 0.2 |
| Kneading temperature | | °C. | 220 | 220 | 220 | 220 |
| Crosslinking method | Method | | Alkali treatment | Hot water treatment | Dehydrating condensation catalyst | Dehydrating condensation catalyst |
| | Crosslinking reaction timing | | Crosslinking step | Crosslinking step | Sheet-forming step | Porous body-forming step |
| | Reagent | | Aqueous NaOH solution | Steam | Organic tin (II) | Organic tin (II) |
| | Temperature | °C. | 80 | 90 | 220 | 85 |
| | Crosslinking treatment tank pH | | 14 | 7 | — | — |
| | Washing treatment tank pH | | 7 to 12 | 7 | — | — |
| Basic separator properties | Membrane thickness | μm | 8 | 8 | 8.2 | 8 |
| | Porosity | % | 35 | 35 | 3 | 36 |
| | Air permeability | sec/100 cm³ | 3600 | 147 | 9050 | 155 |
| | Metal content ICP | [Sn] | ppm | 0.1 | 0.1 | 310 | 220 |
| | | [Zn] | ppm | 0.1 | 0.1 | 0.1 | 0.1 |
| | | [Ti] | ppm | 0.5 | 0.5 | 0.5 | 0.5 |
| | | [Cu] | ppm | 0.1 | 0.1 | 0.1 | 0.1 |
| Resin aggregates in separator | | /1000 m² | 2902 | 5 | 3287 | 5 |
| TMA membrane rupture temperature | | °C. | 207 | 135 | 175 | 178 |
| Battery cycle stability 1 | | % | — | 90 | — | 55 |
| Battery destruction safety 1 | Internal maximum heat release rate | °C./sec | 18 | 130 | — | 14 |
| | Voltage reduction (3 V reduction time) | sec | 6 | 2 | — | none |
| Extrusion stability | | | A | A | B | A |

The term "resin composition" used in Tables 1 to 3 indicates the percentage with respect to the total silane graft-modified polyolefin and polyethylene content.

The term "method" used in Tables 1 to 3 indicates the method of the silane crosslinking reaction, classifying it as an alkali treatment, acid treatment, hot water treatment or dehydrating condensation catalyst method.

The term "timing of crosslinking reaction" used in Tables 1 to 3 indicates that the silane crosslinking reaction was carried out in the (1) sheet-forming step, (2) stretching step, (3) porous body-forming step, (4) heat treatment step, (5) affinity treatment step, (6) crosslinking step or (7) washing and drying step as described above.

Incidentally, in Example 1-4a 10% hydrochloric acid solution was used instead of a 25% aqueous caustic soda solution, and in Comparative Example 1-2 the crosslinking step of the Membrane Formation Example was carried out using a 2.5 kg/m² steam treatment tank instead of immersion in a 25% aqueous caustic soda solution. For Comparative Examples I-3 and I-4, crosslinking reaction was carried out with the timing listed in Table 3, and the crosslinking step was omitted.

In Example I-11, the washing time in the production example described above was changed from 60 seconds to 10 minutes for adjustment of the amount of metal ion.

The term "reagent" in Tables 1 to 3 indicates the reagent used for the crosslinking step in the Membrane Formation Example, with the exception of Comparative Examples I-3 and I-4.

The term "temperature" in Tables 1 to 3 indicates the temperature during the step listed under "Timing of crosslinking reaction".

The terms "crosslinking treatment tank pH" and "washing treatment tank pH" in Tables 1 to 3 indicate the pH values in each tank, and for example, "7 to 12" means that the pH was distributed across a range from the area near the tank inlet to the area near the outlet.

The "silane-modified polyethylene (B)" in Tables 1 to 3 is a silane-modified polyethylene with a density of 0.95 g/cm³ and a melt mass-flow rate (MFR) of 0.4 g/min at 190° C.

<Experiment Group II>

[Silane Graft-Modified Polyolefin Production Method]

The polyolefin starting material to be used as the silane graft-modified polyolefin may be one with a viscosity-average molecular weight (Mv) of 100,000 to 1,000,000, a weight-average molecular weight (Mw) of 30,000 to 920,000, and a number-average molecular weight of 10,000 to 150,000, and it may be propylene or a butene-copolymerized α-olefin. After melt kneading the polyethylene starting material with an extruder while adding an organic peroxide (di-t-butyl peroxide) and generating radicals in the polymer chain of the α-olefin, it was filled with trimethoxyalkoxide-substituted vinylsilane and addition reaction was carried out to introduce alkoxysilyl groups into the α-olefin polymer, forming a silane-graft structure. A suitable amount of an antioxidant (pentaerythritoltetrakis[3-(3,5-di-tetra-butyl-4-hydroxyphenyl)propionate]) was simultaneously added to adjust the radical concentration in the system, thus inhibiting chain-style chain reaction (gelation) in the α-olefin. The obtained silane-grafted polyolefin molten resin was cooled in water and pelletized, after which it was heat-dried at 80° C. for 2 days and the water and unreacted trimethoxyalkoxide-substituted vinylsilane were removed. The residual concentration of the unreacted trimethoxyalkoxide-substituted vinylsilane in the pellets was about 10 to 1500 ppm.

The silane graft-modified polyolefins obtained by this method was used as the "Silane-modified polyethylene (B)" in Tables 1 to 3. The silane graft-modified polyolefin used here had a density of 0.94 g/cm³ and an MFR of 0.65 g/min.

[Membrane Formation and Coating Example II]

(Formation of Microporous Membrane)

To 79.2 wt % of polyethylene homopolymer with a weight-average molecular weight of 500,000 (polyethylene (A)) there was added 19.8 wt % of silane-grafted polyethylene (silane-modified polyethylene (B)) with an MFR (190° C.) of 0.4 g/min, obtained using a polyolefin with a viscosity-average molecular weight of 20,000 as starting material and modification reaction with trimethoxyalkoxide-substituted vinylsilane (the respective contents of resin compositions (A) and (B) thus being 80% and 20%), and 1 wt % of pentaerythrityl-tetrakis-[3-(3,5-di-t-butyl-4-hydroxyphenyl)propionate] as an antioxidant, and these were dry blended using a tumbler blender to obtain a mixture. The obtained mixture was supplied to a twin-screw extruder through a feeder, under a nitrogen atmosphere. Liquid paraffin (kinematic viscosity at 37.78° C.: $7.59 \times 10^{-5}$ m²/s) was also injected into the extruder cylinder by a plunger pump.

The mixture was melt kneaded with liquid paraffin in an extruder, and adjusted with a feeder and pump so that the quantity ratio of liquid paraffin in the extruded polyolefin composition was 70 wt % (i.e. a polymer concentration of 30 wt %). The melt kneading conditions were a preset temperature of 220° C., a screw rotational speed of 240 rpm and a discharge throughput of 18 kg/h.

The melt kneaded mixture was then extrusion cast through a T-die onto a cooling roll controlled to a surface temperature of 25° C., to obtain a gel sheet (molded sheet) with a raw membrane thickness of 1400 μm.

The molded sheet was then simultaneously fed into a biaxial tenter stretching machine for biaxial stretching, to obtain a stretched sheet. The stretching conditions were an MD factor of 7.0, a TD factor of 6.0 (i.e. a factor of 7×6), and a biaxial stretching temperature of 125° C.

The stretched gel sheet was subsequently fed into a methyl ethyl ketone tank and thoroughly immersed in the methyl ethyl ketone for extraction removal of the liquid paraffin, after which the methyl ethyl ketone was dried off to obtain a porous body.

The porous body to be subjected to heat setting (HS) was fed to a TD tenter and HS was carried out at a heat setting temperature of 125° C. and a stretch ratio of 1.8, after which relaxation was carried out to a factor of 0.5 in the TD direction (i.e. the HS relaxation factor was 0.5), to obtain a microporous membrane.

The obtained microporous membrane was then cut at the edges and wound up as a microporous membrane mother roll with a width of 1,100 mm and a length of 5,000 m.

(Method for Producing Acrylic Latex)

The acrylic latex to be used as the resin binder is produced by the following method.

Into a reactor equipped with a stirrer, reflux condenser, drip tank and thermometer there were loaded 70.4 parts by weight of ion-exchanged water, 0.5 part by weight of "AQUALON KH1025" (registered trademark of Dai-ichi Kogyo Seiyaku Co., Ltd., 25% aqueous solution) as an emulsifier, and 0.5 part by weight of "ADEKA REASOAP SR1025" (registered trademark of Adeka Corp., 25% aqueous solution). The internal temperature of the reactor was then raised to 80° C., and 7.5 parts by weight of a 2% aqueous solution of ammonium persulfate was added while keeping the temperature at 80° C., to obtain an initial mixture. Five minutes after addition of the ammonium persulfate aqueous solution was completed, the emulsified liquid was added dropwise from the drip tank into the reactor over a period of 150 minutes.

The emulsified liquid was prepared by forming a mixture of 70 parts by weight of butyl acrylate; 29 parts by weight of methyl methacrylate; 1 part by weight of methacrylic acid; 3 parts by weight of "AQUALON KH1025" (registered trademark of Dai-ichi Kogyo Seiyaku Co., Ltd., 25% aqueous solution) and 3 parts by weight "ADEKA REASOAP SR1025" (registered trademark of Adeka Corp., 25% aqueous solution) as emulsifiers; 7.5 parts by weight of a 2% aqueous solution of ammonium persulfate; and 52 parts by weight of ion-exchanged water, and mixing with a homomixer for 5 minutes.

Upon completion of the dropwise addition of the emulsified liquid, the internal temperature of the reactor was kept at 80° C. for a period of 90 minutes, after which it was cooled to room temperature. The obtained emulsion was adjusted to a pH of 8.0 with a 25% aqueous ammonium hydroxide solution, and then a small amount of water was added to obtain an acrylic latex with a solid content of 40%. The obtained acrylic latex had a number-mean particle size of 145 nm and a glass transition temperature of −23° C.

(Formation of Inorganic Porous Layer)

A dispersion was prepared by evenly dispersing 95 parts by weight of aluminum hydroxide oxide (mean particle size: 1.4 μm as inorganic particles and 0.4 part by (solid) weight of an aqueous ammonium polycarboxylate solution (SN dispersant 5468 by San Nopco, Ltd., 40% solid concentration) as an ionic dispersing agent, in 100 parts by weight of water. The obtained dispersion was shredded with a bead mill (cell volume: 200 cc, zirconia bead diameter: 0.1 mm, filling volume: 80%), and the particle size distribution of the inorganic particles was adjusted to D50=1.0 μm. To the particle size distribution-adjusted dispersion there was added 4.6 parts by (solid) weight of an acrylic latex (solid concentration: 40%, mean particle size: 145 nm, glass transition temperature: −23° C., constituent monomers: butyl acrylate, methyl methacrylate, methacrylic acid) as a resin binder to prepare an inorganic particle-containing slurry.

The microporous membrane was then continuously wound out from the microporous membrane mother roll and one side of the microporous membrane was coated with the inorganic particle-containing slurry using a gravure reverse coater, after which it was dried with a dryer at 60° C. to remove the water and wound up to obtain a separator mother roll.

During the evaluation, the separator wound out from the mother roll was slit as necessary for use as the evaluation separator.

Examples II-1 to 11-2 and Comparative Example II-2

The microporous membranes listed in Tables 1 to 3 were obtained by the same procedure as Membrane Formation and Coating Example II, except for changing the quantity ratio of components A and B, the presence or absence of the inorganic layer and the crosslinking method and conditions, as shown in Tables 1 to 3.

In Example II-1 the microporous membrane was fed into a 25% aqueous caustic soda solution (temperature: 80° C., pH 8.5 to 14) and in Example 11-2 it was fed into an aqueous 10% hydrochloric acid solution (temperature: 60° C., pH 1 to 6.5), and immersed and retained for 60 seconds for crosslinking treatment of the microporous membrane, before forming the inorganic porous layer.

Comparative Example II-1

To 79.2 wt % of polyethylene homopolymer with a weight-average molecular weight of 500,000 (polyethylene (A)) there was added 19.8 wt % of silane-grafted polyethylene (silane-modified polyethylene (B)) with an MFR (190° C.) of 0.4 g/min, obtained using a polyolefin with a viscosity-average molecular weight of 20,000 as starting material and modification reaction with trimethoxyalkoxide-substituted vinylsilane (the respective contents of resin compositions (A) and (B) thus being 80% and 20%), and 1 wt % of pentaerythrityl-tetrakis-[3-(3,5-di-t-butyl-4-hydroxyphenyl)propionate] as an antioxidant, and these were dry blended using a tumbler blender to obtain a mixture. The obtained mixture was supplied to a twin-screw extruder through a feeder, under a nitrogen atmosphere. Liquid paraffin (kinematic viscosity at 37.78° C.: 7.59×10⁻⁵ m²/s) was also injected into the extruder cylinder by a plunger pump.

The mixture was melt kneaded with liquid paraffin in an extruder, and adjusted with a feeder and pump so that the quantity ratio of liquid paraffin in the extruded polyolefin composition was 70 wt % (i.e. a polymer concentration of 30 wt %). The melt kneading conditions were a preset temperature of 220° C., a screw rotational speed of 240 rpm and a discharge throughput of 18 kg/h.

The melt kneaded mixture was then extrusion cast through a T-die onto a cooling roll controlled to a surface temperature of 25° C., to obtain a gel sheet (molded sheet) with a raw membrane thickness of 1400 μm.

The molded sheet was then simultaneously fed into a biaxial tenter stretching machine for biaxial stretching, to obtain a stretched sheet. The stretching conditions were an MD factor of 7.0, a TD factor of 6.0 (i.e. a factor of 7×6), and a biaxial stretching temperature of 125° C.

The stretched gel sheet was subsequently fed into a methyl ethyl ketone tank and thoroughly immersed in the methyl ethyl ketone for extraction removal of the liquid paraffin, after which the methyl ethyl ketone was dried off to obtain a porous body.

The porous body to be subjected to heat setting (HS) was fed to a TD tenter and HS was carried out at a heat setting temperature of 125° C. and a stretch ratio of 1.8, after which relaxation was carried out to a factor of 0.5 in the TD direction (i.e. the HS relaxation factor was 0.5).

In Comparative Example 1, the heat-treated porous body was to be used as the separator, and therefore the obtained porous body was cut at the edges and wound up as a mother roll with a width of 1,100 mm and a length of 5,000 m.

The obtained heat-treated porous body was also fed into an ethanol bath (affinity treatment tank) and immersed and retained for 60 seconds for affinity treatment of the heat-treated porous body to obtain an affinity-treated porous body.

In addition, the affinity-treated porous body was fed into a 25% aqueous caustic soda solution (temperature: 80° C., pH 8.5 to 14) and immersed and retained for 60 seconds for crosslinking treatment of the affinity-treated porous body to obtain a crosslinked porous body.

The crosslinked porous body was fed into water (washing treatment tank) and immersed and retained for 60 seconds for washing of the crosslinked porous body. It was then fed to a conveyor dryer and dried at 120° C. for 60 seconds to obtain a microporous membrane.

The obtained microporous membrane was cut at the edges and wound up as a mother roll with a width of 1,100 mm and a length of 5,000 m.

During the evaluation for Comparative Example II-1, the microporous membrane wound out from the mother roll was slit as necessary for use as the evaluation separator.

[Evaluation Results]

The microporous membranes and batteries obtained in Examples II-1 to 11-2 and Comparative Examples II-1 to 11-2 were evaluated by each of the evaluation methods described above, and the evaluation results are shown in Table 4.

Modification reaction of the trimethoxyalkoxide-substituted vinylsilane in this manner yielded a silane-modified polyethylene with an MFR (190° C.) of 0.4 g/min.

(Fabrication of Layer A)

After combining 35 weight % of the previously obtained silane-modified polyethylene with 65 weight % of polyethylene homopolymer having a weight-average molecular weight of 700,000 to obtain a resin blend, 1 weight % of pentaerythrityl-tetrakis-[3-(3,5-di-t-butyl-4-hydroxyphenyl) propionate] was added to the blend as an antioxidant, and a tumbler blender was used for dry blending to obtain a mixture. The obtained mixture was supplied to a twin-screw

TABLE 4

|  |  |  |  | Example II-1 | Example 11-2 | Comparative Example II-1 | Comparative Example 11-2 |
|---|---|---|---|---|---|---|---|
| Separator | Resin composition | Polyethylene (A) | wt % | 80% | 80% | 80% | 100% |
|  |  | Silane-modified polyethylene(B) | wt % | 20% | 20% | 20% | 0% |
|  | Kneading temperature |  | ° C. | 220 | 220 | 220 | 220 |
|  | Inorganic layer composition | Inorganic particles | Weight ratio | 95% | 95% | — | 95% |
|  |  |  | Type | AlO(OH) | AlO(OH) |  | AlO(OH) |
|  |  | Resin binder | Tg(° C.) | -23 | -23 |  | -23 |
|  | Crosslinking method | Method |  | Alkali treatment After pore formation | Acid treatment After pore formation | Alkali treatment After pore formation | — |
|  |  | Crosslinking reaction tinting |  |  |  |  |  |
|  |  | Reagent |  | NaOHaq | HClaq | NaOHaq |  |
|  |  | Temperature | ° C. | 80 | 60 | 80 |  |
|  |  | pH |  | 8.5-14 | 1-6.5 | 8.5-14 |  |
|  | Basic properties of resinous microporous membrane | Membrane thickness | μm | 11 | 11 | 11 | 9.5 |
|  |  | Porosity | % | 40 | 40 | 40 | 38 |
|  |  | Air permeability | sec/100 cm$^3$ | 160 | 160 | 160 | 172 |
|  | Inorganic layer thickness |  | μm | 4 | 4 | — | 4 |
|  | Shutdown/ rupture resistance | Shutdown temperature (i) | ° C. | 165 | 171 | 165 | 143 |
|  |  | Membrane rupture temperature (i) | ° C. | >200 | >200 | >200 | 151 |
|  | Resin aggregates in microporous membrane |  | /1000 m$^2$ | 2 | 2 | 2 | 3 |
| Battery | Crosslinking method |  |  | — | — | — | — |
|  | Battery cycle stability 1 |  | % | 97 | 97 | 54 | 96 |
|  | Battery destruction safety 1 | Internal maximum heat release rate | ° C./sec | 6 | 6 | 120 | 235 |
|  |  | Voltage reduction (3 V reduction time) | sec | >300 | >300 | 7 | 2 |

Experiment Group III

Example III-1

Fabrication of Layer a (Fabrication of Silane Graft-Modified Polyolefin)

Using polyethylene with a viscosity-average molecular weight of 100,000 as the polyethylene, the polyethylene starting material was melt kneaded with an extruder while adding an organic peroxide (di-t-butyl peroxide) and generating radicals in the polymer chain of the α-olefin, and then it was filled with trimethoxyalkoxide-substituted vinylsilane and addition reaction was carried out to introduce alkoxysilyl groups into the α-olefin polymer, forming a silane-graft structure. A suitable amount of an antioxidant (pentaerythritoltetrakis[3-(3,5-di-tetra-butyl-4-hydroxyphenyl)propionate]) was simultaneously added to the reaction system to adjust the radical concentration in the system, thus inhibiting chain-style chain reaction (gelation) in the α-olefin. The obtained silane-grafted polyolefin molten resin was cooled in water and pelletized, after which it was heat dried at 80° C. for 2 days and the water and unreacted trimethoxyalkoxide-substituted vinylsilane were removed. The residual concentration of the unreacted trimethoxyalkoxide-substituted vinylsilane in the pellets was about 1500 ppm or lower.

extruder through a feeder, under a nitrogen atmosphere. Liquid paraffin (kinematic viscosity at 37.78° C.: 7.59×10$^{-5}$ m$^2$/s) was also injected into the extruder cylinder by a plunger pump.

The mixture was melt kneaded with liquid paraffin in an extruder, and adjusted with a feeder and pump so that the quantity ratio of liquid paraffin in the extruded polyolefin composition was 70 weight % (i.e. a polymer concentration of 30 weight %). The melt kneading conditions were a preset temperature of 220° C., a screw rotational speed of 240 rpm and a discharge throughput of 18 kg/h. The melt kneaded mixture was extrusion cast through a T-die onto a cooling roll controlled to a surface temperature of 25° C., to obtain a gel sheet (molded sheet) with a raw membrane thickness of 1400 μm.

The molded sheet was then simultaneously fed into a biaxial tenter stretching machine for biaxial stretching, to obtain a stretched sheet. The stretching conditions were an MD factor of 7.0, a TD factor of 6.0 (i.e. a factor of 7×6), and a biaxial stretching temperature of 123° C.

The stretched gel sheet was fed into a dichloromethane tank and thoroughly immersed in the dichloromethane for extraction removal of the liquid paraffin, after which the dichloromethane was dried off to obtain a porous body.

Next, the porous body to be subjected to heat setting (HS) was fed to a TD tenter for heat setting and relaxation. The heat setting conditions inputted to the TD tenter were for HS at a heat setting temperature of 132° C. and a stretch ratio of 2.1, and this was followed by relaxation to a TD factor of 1.9 to obtain a microporous membrane.

The obtained microporous membrane was then cut at the edges and wound up as a mother roll with a width of 1,100 mm and a length of 5,000 m.

During the evaluation, the microporous membrane wound out from the mother roll was slit as necessary for use as the evaluation layer A.

The membrane thickness, air permeability and porosity were measured for the obtained evaluation layer A, and they are shown in Table 5.

<Fabrication of Layer B>

A dispersion was prepared by evenly dispersing 95 parts by weight of aluminum hydroxide oxide (mean particle size: 1.4 μm as inorganic particles and 0.4 part by (solid) weight of an aqueous ammonium polycarboxylate solution (SN dispersant 5468 by San Nopco, Ltd., 40% solid concentration) as an ionic dispersing agent, in 100 parts by weight of water. The obtained dispersion was shredded with a bead mill (cell volume: 200 cc, zirconia bead diameter: 0.1 mm, filling volume: 80%), and the particle size distribution of the inorganic particles was adjusted to D50=1.0 μm, to prepare an inorganic particle-containing slurry.

The microporous membrane was then continuously wound out from the microporous membrane mother roll and one side of the microporous membrane was coated with the inorganic particle-containing slurry using a gravure reverse coater, after which it was dried with a dryer at 60° C. to remove the water and wound up to obtain a separator mother roll.

During the evaluation, the separator was wound out from the mother roll and slit as necessary for use as the evaluation separator.

Examples III-2 to III-14 and Comparative Examples III-1 and III-2

With the physical properties listed in Table 5 as the target, one or more from among the weight-average molecular weight of the polyethylene homopolymer, the set stretching conditions, the heat setting conditions and the relaxation conditions were changed. The composition of layer B was also changed as shown in Table 5.

Separators were fabricated by the same method as Example III-1 except for these changes, and the obtained separators were used for the evaluation described above. The evaluation results are shown in Table 5.

TABLE 5

|  |  |  |  |  | Example III | | | | | | | |
|---|---|---|---|---|---|---|---|---|---|---|---|---|
|  |  |  |  |  | 1 | 2 | 3 | 4 | 5 | 6 | 7 | 8 |
| Separator | Layer A | Polyethylene | weight % | | 65 | 65 | 65 | 65 | 65 | 65 | 60 | 95 |
| | | Silane-modified polyolefin | weight % | | 35 | 35 | 35 | 35 | 35 | 35 | 40 | 5 |
| | | Thickness (TA) | μm | | 11.0 | 3.0 | 20.5 | 3.0 | 11.0 | 11.0 | 11.0 | 11.0 |
| | | Porosity | % | | 45 | 38 | 49 | 38 | 45 | 45 | 38 | 42 |
| | | Air permeability | sec/cm³ | | 112 | 105 | 126 | 105 | 112 | 112 | 152 | 107 |
| | | Puncture strength | gf/20 μm | | 510 | 380 | 560 | 1192 | 510 | 510 | 506 | 505 |
| | Layer B | Inorganic particles | Weight ratio | wt % | 95.00 | 95.00 | 95.00 | 95.00 | 95.00 | 95.00 | 98.00 | 35.00 |
| | | | Type | — | AlO(OH) | AlO(OH) | AlO(OH) | AlO(OH) | AlO(OH) | AlO(OH) | AlO(OH) | AlO(OH) |
| | | Thickness (TB) | μm | | 3.5 | 12 | 1.5 | 1 | 3.5 | 3.5 | 3.5 | 3.5 |
| | Ratio (TA/TB) | | — | | 3.14 | 0.25 | 13.67 | 3.00 | 3.14 | 3.14 | 3.14 | 3.14 |
| | Total thickness (TA + TB) | | μm | | 14.5 | 15 | 22 | 4 | 14.5 | 14.5 | 14.5 | 14.5 |
| | TMA test | Membrane rupture temperature | ° C. | | 210.00 | 212.00 | 208.00 | 210.00 | 175.00 | 225.00 | 211.00 | 207.00 |
| | F/MD test | Shutdown temperature (ii) | ° C. | | 143 | 142 | 144 | 142 | 131 | 160 | 143 | 143 |
| | | Meltdown temperature (ii) | ° C. | | 220 | 210 | 230 | 200 | 205 | 200 | 203 | 210 |
| | 150° C. heat shrinkage | Before formation of crosslinked structure | % | | 56 | 55 | 63 | 53 | 57 | 57 | 58 | 55 |
| | | After formation of crosslinked structure | % | | 7 | 4 | 11 | 9 | 5 | 7 | 2 | 48 |
| | factor | Change factor | factor | | 0.13 | 0.07 | 0.17 | 0.17 | 0.13 | 0.13 | 0.03 | 0.87 |
| Battery | Battery cycle stability 2 (300 cycles) | | % | | 98 | 98 | 98 | 98 | 97 | 98 | 93 | 93 |
| | Passing rate in safety test 2 | 200 cycles | % | | 97 | 95 | 95 | 97 | 95 | 97 | 97 | 97 |
| | | 1000 cycles | % | | 90 | 89 | 87 | 88 | 88 | 89 | 81 | 83 |

TABLE 5-continued

|  |  |  |  | Example III ||||||| Comparative Example III ||
|---|---|---|---|---|---|---|---|---|---|---|---|
|  |  |  |  | 9 | 10 | 11 | 12 | 13 | 14 | 1 | 2 |
| Separtor | Layer A | Polyethylene | weight % | 65 | 65 | 40 | 65 | 65 | 60 | 65 | 65 |
|  |  | Silane-modified polyolefin | weight % | 35 | 35 | 60 | 35 | 35 | 40 | 35 | 35 |
|  |  | Thickness (TA) | μm | 20.0 | 3.0 | 3.0 | 11.0 | 5 | 9.0 | 11.5 | 3.0 |
|  |  | Porosity | % | 45 | 45 | 38 | 45 | 36 | 40 | 45 | 46 |
|  |  | Air permeability | sec/cm³ | 112 | 112 | 105 | 112 | 150 | 90 | 112 | 112 |
|  |  | Puncture strength | gf/20 μm | 510 | 510 | 380 | 510 | 250 | 250 | 1168 | 1168.5 |
|  | Layer B | Inorganic particles | Weight ratio wt % | 95.00 | 95.00 | 94.00 | 99.50 | 95 | 98 | 95.00 | 94.00 |
|  |  |  | Type | AlO(OH) | AlO(OH) | AlO(OH) | AlO(OH) | AlO(OH) | AlO(OH) | AlO(OH) | AlO(OH) |
|  |  | Thickness (TB) | μm | 3.5 | 0.5 | 12 | 3.5 | 0.4 | 3 | 0.5 | 16 |
|  | Ratio (TA/TB) |  | — | 5.71 | 6.00 | 0.25 | 3.14 | 12.5 | 0.33 | 23.00 | 0.19 |
|  | Total thickness (TA + TB) |  | μm | 23.5 | 3.5 | 15 | 14.5 | 5.4 | 12 | 12.00 | 19.00 |
|  | TMA test | Membrane rupture temperature | ° C. | 215.00 | 205.00 | 211.00 | 209.00 | 198 | 208 | 178.00 | 159.00 |
|  | F/MD test | Shutdown temperature (ii) | ° C. | 143 | 143 | 140 | 143 | 143 | 136.5 | 140 | 142 |
|  |  | Meltdown temperature (ii) | ° C. | 210 | 215 | 215 | 200 | 220 | >200 | 175 | 156 |
|  | 150° C. heat shrinkage factor | Before formation of crosslinked structure | % | 56 | 56 | 63 | 56 | 51 | 55 | 63 | 53 |
|  |  | After formation of crosslinked structure | % | 7 | 7 | 1.2 | 7 | 3 | 4 | 1.2 | 49 |
|  |  | Change factor | factor | 0.13 | 0.13 | 0.02 | 0.13 | 0.06 | 0.07 | 0.019 | 0.92 |
| Battery | Battery cycle stability 2 (300 cycles) |  | % | 89 | 91 | 81 | 65 | 91 | 95 | 65 | 60 |
|  | Passing rate in safety test 2 | 200 cycles | % | 95 | 96 | 83 | 97 | 93 | 92 | 48 | 43 |
|  |  | 1000 cycles | % | 78 | 73 | 60 | 63 | 81 | 87 | 0 | 0 |

Experiment Group IV

Example IV-1

Fabrication of Layer a

Fabrication of Silane Graft-Modified Polyolefin

Using polyethylene with a viscosity-average molecular weight of 100,000 as the polyethylene, the polyethylene starting material was melt kneaded with an extruder while adding an organic peroxide (di-t-butyl peroxide) and generating radicals in the polymer chain of the α-olefin, and then it was filled with trimethoxyalkoxide-substituted vinylsilane and addition reaction was carried out to introduce alkoxysilyl groups into the α-olefin polymer, forming a silane-graft structure. A suitable amount of an antioxidant (pentaerythritoltetrakis[3-(3,5-di-tetra-butyl-4-hydroxyphenyl)propionate]) was simultaneously added to the reaction system to adjust the radical concentration in the system, thus inhibiting chain-style chain reaction (gelation) in the α-olefin. The obtained silane-grafted polyolefin molten resin was cooled in water and pelletized, after which it was heat-dried at 80° C. for 2 days and the water and unreacted trimethoxyalkoxide-substituted vinylsilane were removed. The residual concentration of the unreacted trimethoxyalkoxide-substituted vinylsilane in the pellets was about 1500 ppm or lower.

Modification reaction of the trimethoxyalkoxide-substituted vinylsilane in this manner yielded a silane-modified polyolefin with an MFR (190° C.) of 0.4 g/min.

(Fabrication of Layer A)

After combining 35 weight % of the previously obtained silane-modified polyethylene with 65 weight % of polyethylene homopolymer having a weight-average molecular weight of 750,000 to obtain a resin blend, 1 weight % of pentaerythrityl-tetrakis-[3-(3,5-di-t-butyl-4-hydroxyphenyl) propionate] was added to the blend as an antioxidant, and a tumbler blender was used for dry blending to obtain a mixture. The obtained mixture was supplied to a twin-screw extruder through a feeder, under a nitrogen atmosphere. Also, liquid paraffin (kinematic viscosity at 37.78° C.: $7.59 \times 10^{-5}$ m²/s) was injected into the extruder cylinder by a plunger pump.

The mixture was melt kneaded with liquid paraffin in an extruder, and adjusted with a feeder and pump so that the quantity ratio of liquid paraffin in the extruded polyolefin composition was 70 weight % (i.e. a polymer concentration of 30 weight %). The melt kneading conditions were a preset temperature of 220° C., a screw rotational speed of 240 rpm and a discharge throughput of 18 kg/h. The melt kneaded mixture was then extrusion cast through a T-die onto a cooling roll controlled to a surface temperature of 25° C., to obtain a gel sheet (molded sheet) with a raw membrane thickness of 1280 μm.

The molded sheet was then simultaneously fed into a biaxial tenter stretching machine for biaxial stretching, to obtain a stretched sheet. The stretching conditions were an MD factor of 7.0, a TD factor of 6.5 (i.e. a factor of 7×6.5), and a biaxial stretching temperature of 125° C.

The stretched gel sheet was fed into a dichloromethane tank and thoroughly immersed in the dichloromethane for extraction removal of the liquid paraffin, after which the dichloromethane was dried off to obtain a porous body.

The porous body to be subjected to heat setting (HS) was fed to a TD tenter and HS was carried out at a heat setting temperature of 131° C. and a stretch ratio of 1.9, after which relaxation was carried out to a factor of 1.7 in the TD direction to obtain a microporous membrane.

The obtained microporous membrane was then cut at the edges and wound up as a mother roll with a width of 1,100 mm and a length of 5,000 m.

During the evaluation, the microporous membrane wound out from the mother roll was slit as necessary for use as the evaluation layer A.

The membrane thickness, air permeability and porosity were measured for the obtained evaluation layer A, and they are shown in Table 6.

coater, after which it was dried with a dryer at 60° C. to remove the water and wound up to obtain a separator mother roll.

During the evaluation, the separator was wound out from the mother roll and slit as necessary for use as the evaluation separator.

Examples IV-2 to IV-3 and Comparative Examples IV-1 to IV-2

With the physical properties listed in Table 6 as the target, one or more from among the weight-average molecular weight of the polyethylene homopolymer, the set stretching conditions, the heat setting conditions and the relaxation conditions were changed. The composition of layer B was also changed as shown in Table 6.

Separators were fabricated by the same method as Example IV-1 except for these changes, and the obtained separators were used for the evaluation described above. The evaluation results are shown in Table 6.

TABLE 6

|  |  |  |  |  | Example IV | | | Comparative Example IV | |
| --- | --- | --- | --- | --- | --- | --- | --- | --- | --- |
|  |  |  |  |  | 1 | 2 | 3 | 1 | 2 |
| Separator | Layer A | Polyethylene | | weight % | 65 | 65 | 65 | 65 | 65 |
|  |  | Silane-modified polyolefin | | weight % | 35 | 35 | 35 | 35 | 35 |
|  |  | Thickness (TA) | | μm | 11.0 | 11.0 | 11.0 | 11.5 | 3.0 |
|  |  | Porosity | | % | 48 | 45 | 45 | 25 | 45 |
|  |  | Air permeability | | sec/cm$^3$ | 108 | 112 | 112 | 280 | 112 |
|  |  | Puncture strength | | gf/20 μm | 420 | 510 | 510 | 168 | 168.5 |
|  | Layer B | Inorganic particles | Weight ratio | wt % | 95.00 | 95.00 | 95.00 | 95.00 | 94.00 |
|  |  |  | Type | — | AlO(OH) | AlO(OH) | AlO(OH) | AlO(OH) | AlO(OH) |
|  |  | Thickness (TB) | | μm | 3.5 | 3.5 | 3.5 | 0.5 | 16 |
|  | Ratio (TA/TB) | | | — | 3.14 | 3.14 | 3.14 | 23.00 | 0.19 |
|  | Total thickness (TA + TB) | | | μm | 14.5 | 14.5 | 14.5 | 12.00 | 19.00 |
|  | TMA test | Membrane rupture temperature | | ° C. | 210.00 | 175.00 | 225.00 | 178.00 | 159.00 |
|  | F/MD test | Shutdown temperature (ii) | | ° C. | 143 | 131 | 160 | 128 | 165 |
|  |  | Meltdown temperature (ii) | | ° C. | 219 | 205 | 200 | 175 | 156 |
|  | 150° C. heat shrinkage factor | Before formation of crosslinked structure | | % | 56 | 57 | 57 | 65 | 38 |
|  |  | After formation of crosslinked structure | | % | 7 | 5 | 7 | 48 | 30 |
|  |  | Change factor | | times | 0.13 | 0.13 | 0.13 | 0.738 | 0.789 |
| Battery | Battery cycle stability 2 (300 cycles) | | | % | 99 | 97 | 98 | 38 | 61 |
|  | Passing rate in safety test 2 | 200 cycles | | % | 96 | 95 | 97 | 38 | 41 |
|  |  | 1000 cycles | | % | 92 | 88 | 89 | 3 | 1 |

<Fabrication of Layer B>

A dispersion was prepared by evenly dispersing 95 parts by weight of aluminum hydroxide oxide (mean particle size: 1.4 μm as inorganic particles and 0.4 part by (solid) weight of an aqueous ammonium polycarboxylate solution (SN dispersant 5468 by San Nopco, Ltd., 40% solid concentration) as an ionic dispersing agent, in 100 parts by weight of water. The obtained dispersion was shredded with a bead mill (cell volume: 200 cc, zirconia bead diameter: 0.1 mm, filling volume: 80%), and the particle size distribution of the inorganic particles was adjusted to D50=1.0 μm, to prepare an inorganic particle-containing slurry.

The microporous membrane was then continuously wound out from the microporous membrane mother roll and one side of the microporous membrane was coated with the inorganic particle-containing slurry using a gravure reverse <Experiment Group V>

Porous membranes were formed in the same manner as Examples 1 to 3 and Comparative Examples 2 to 3 described in PTL 5 (Japanese Unexamined Patent Publication No. 2001-176484), and were provided as porous membranes V-1 to V-5, respectively. The gel fraction (%), heat-resistant temperature (° C.) and needle puncture strength (gf/25 μm) of the porous membranes V-1 to V-5 were evaluated by the methods described in PTL 5, and the TMA membrane rupture temperature under load was measured according to <TMA membrane rupture temperature> of the present specification. The results are shown in Table 7.

TABLE 7

| Porous Membrane Example | PTL 5 Example No. | Gel fraction (%) | Heat-resistant temperature (° C.) | Needle puncture strength (gf/25 μm) | TMA membrane rupture temperature load (° C.) in present specification |
|---|---|---|---|---|---|
| V-1 | Example 1 | 68 | 185 | 450 | <180 |
| V-2 | Example 2 | 69 | 205 | 680 | <180 |
| V-3 | Example 3 | 42 | 170 | 460 | <180 |
| V-4 | Comparative Example 2 | 36 | 155 | 440 | <180 |
| V-5 | Comparative Example 3 | 80 | 200 | 260 | <180 |

The following is clear from Table 7.

(a) Since the heat-resistant temperatures in PTL 5 are measuring temperatures under conditions without an applied load, they do not correspond to the TMA membrane rupture temperature as explained for the first, second and third embodiments of the present invention.

(b) When the porous membranes V-1 to V-5 crosslinked under the conditions of 90° C. temperature, 95% humidity and 4 hours, as described in Examples 1 to 3 and Comparative Examples 2 and 3 of PTL 5 are measured for TMA membrane rupture temperature under the conditions described in <TMA membrane rupture temperature>, their TMA membrane rupture temperatures are below 180° C.

The invention claimed is:

1. A separator for an electricity storage device comprising a first porous layer (layer A) with a crosslinked structure that includes a silane-modified polyethylene, and a second porous layer (layer B) that includes inorganic particles, wherein:
   a ratio of a thickness (TA) of the first porous layer (layer A) with respect to a thickness (TB) of layer B the second porous layer (layer B) (TA/TB) is 0.22 to 14,
   a shutdown temperature of the separator is 130° C. to 160° C., and
   a meltdown temperature of the separator is 200° C. or higher, as measured based on electrical resistance under pressure of 10.0 MPa.

2. The separator for an electricity storage device according to claim 1, wherein a membrane rupture temperature of the first porous layer (layer A) is 180° C. to 220° C., as measured by thermomechanical analysis (TMA).

3. The separator for an electricity storage device according to claim 1, wherein the second porous layer (layer B) includes a resin binder.

4. The separator for an electricity storage device according to claim 1, wherein the first porous layer (layer A) further includes polyethylene as a polyolefin different from the silane-modified polyethylene.

5. The separator for an electricity storage device according to claim 1, wherein the amount of the silane-modified polyethylene in the first porous layer (layer A) is 3 weight % or greater based on the total weight of the first porous layer (layer A).

6. The separator for an electricity storage device according to claim 1, wherein an amount of the inorganic particles in the second porous layer (layer B) is 20 weight % to 99.5% weight % based on a total weight of the second porous layer (layer B).

7. The separator for an electricity storage device according to claim 1, wherein a total thickness of the first porous layer (layer A) and the second porous layer (layer B) (TA+TB) is 3.0 μm to 22 μm.

8. An electricity storage device comprising an electrode, the separator for an electricity storage device according to claim 1, and a nonaqueous electrolyte solution.

9. A method for producing the separator for an electricity storage device according to claim 1, comprising the following steps:
   (1) a sheet-forming step in which the silane-modified polyethylene, a polyethylene different from the silane-modified polyethylene, and a plasticizer are extruded into a sheet using an extruder, cooled to solidification and shaped into a molded sheet;
   (2) a stretching step in which the molded sheet is subjected to biaxial stretching to a 20-fold to 250-fold area increase to form a stretched sheet;
   (3) a porous body-forming step in which the plasticizer is extracted from the stretched sheet to form a porous body;
   (4) a heat treatment step in which the porous body is subjected to heat treatment and subjected to stretching and relaxation in the transverse direction to obtain a heat-treated porous body;
   (5) an affinity treatment step in which the heat-treated porous body is immersed in an organic solvent that is amphiphilic for water and organic materials, and the liquid affinity of the heat-treated porous body is increased to obtain an affinity-treated porous body impregnated with the organic solvent;
   (6) a crosslinking step in which the affinity-treated porous body (i) is contacted with a mixture of an organometallic catalyst and water, or (ii) is immersed in a base solution or an acid solution, wherein in the crosslinking step, the affinity-treated porous body is subjected to a silane dehydration condensation reaction to form oligosiloxane bonds, obtaining a crosslinked porous body;
   (7) a washing and drying step in which the crosslinked porous body is washed with water and dried to obtain a microporous membrane comprising the silane-modified polyolefin; and
   (8A) a coating step in which an inorganic porous layer including inorganic particles and a resin binder is formed on at least one surface of the microporous membrane.

* * * * *